United States Patent
Murakami et al.

(10) Patent No.: US 6,826,290 B1
(45) Date of Patent: Nov. 30, 2004

(54) IMAGE PROCESSING APPARATUS AND METHOD AND STORAGE MEDIUM

(75) Inventors: Tomochika Murakami, Kawasaki (JP); Keiichi Iwamura, Yokohama (JP); Junichi Hayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 520 days.

(21) Appl. No.: 09/688,108

(22) Filed: Oct. 16, 2000

(30) Foreign Application Priority Data

Oct. 20, 1999 (JP) .......................... 11-298160
Oct. 20, 1999 (JP) .......................... 11-298161
Oct. 20, 1999 (JP) .......................... 11-298169

(51) Int. Cl.$^7$ ............................................... G06K 9/00
(52) U.S. Cl. ...................... 382/100; 382/243; 708/671; 380/201
(58) Field of Search ................................ 382/100, 125, 382/232, 234, 245, 243, 248, 247, 239; 708/671, 625; 380/286, 1, 28, 201, 202, 203, 204, 279; 705/18

(56) References Cited

U.S. PATENT DOCUMENTS

| | | | | |
|---|---|---|---|---|
| 4,366,549 A | * | 12/1982 | Katayama | 708/625 |
| 5,600,720 A | * | 2/1997 | Iwamura et al. | 380/1 |
| 5,666,419 A | * | 9/1997 | Yamamoto et al. | 380/28 |
| 5,937,395 A | * | 8/1999 | Iwamura | 705/30 |
| 6,088,454 A | * | 7/2000 | Nagashima et al. | 380/286 |
| 6,209,096 B1 | * | 3/2001 | Taruguchi | 713/193 |
| 6,418,232 B1 | * | 7/2002 | Nakano et al. | 382/100 |

OTHER PUBLICATIONS

"Digital Halftoning Technique Using a Blue–Noise Mask", T. Mitsa, et al., J. Opt. Soc. Am. A/vol. 9, No. 11, Nov. 1992.

* cited by examiner

*Primary Examiner*—Bhavesh M. Mehta
*Assistant Examiner*—Seyed Azarian
(74) *Attorney, Agent, or Firm*—Fitzpatrick, Cella, Harper & Scinto

(57) ABSTRACT

To provide a variety of methods for extracting digital watermark information from an image as correctly as possible. For example, a first pattern arrangement and a second pattern arrangement which is different from the first pattern arrangement for use in a calculation for extracting the digital watermark information are provided. A state of an original image without the digital watermark information embedded is inferred, using a second pattern arrangement, and a reliability of the digital watermark information to be extracted in accordance with the state is determined. Or to decide the embedding position of the digital watermark information from the image data, the extracting start position is discriminated by detecting the positional information by multiple times at the different extracting start positions. Or to detect a geometrical distortion, a registration signal is embedded on the image.

30 Claims, 27 Drawing Sheets

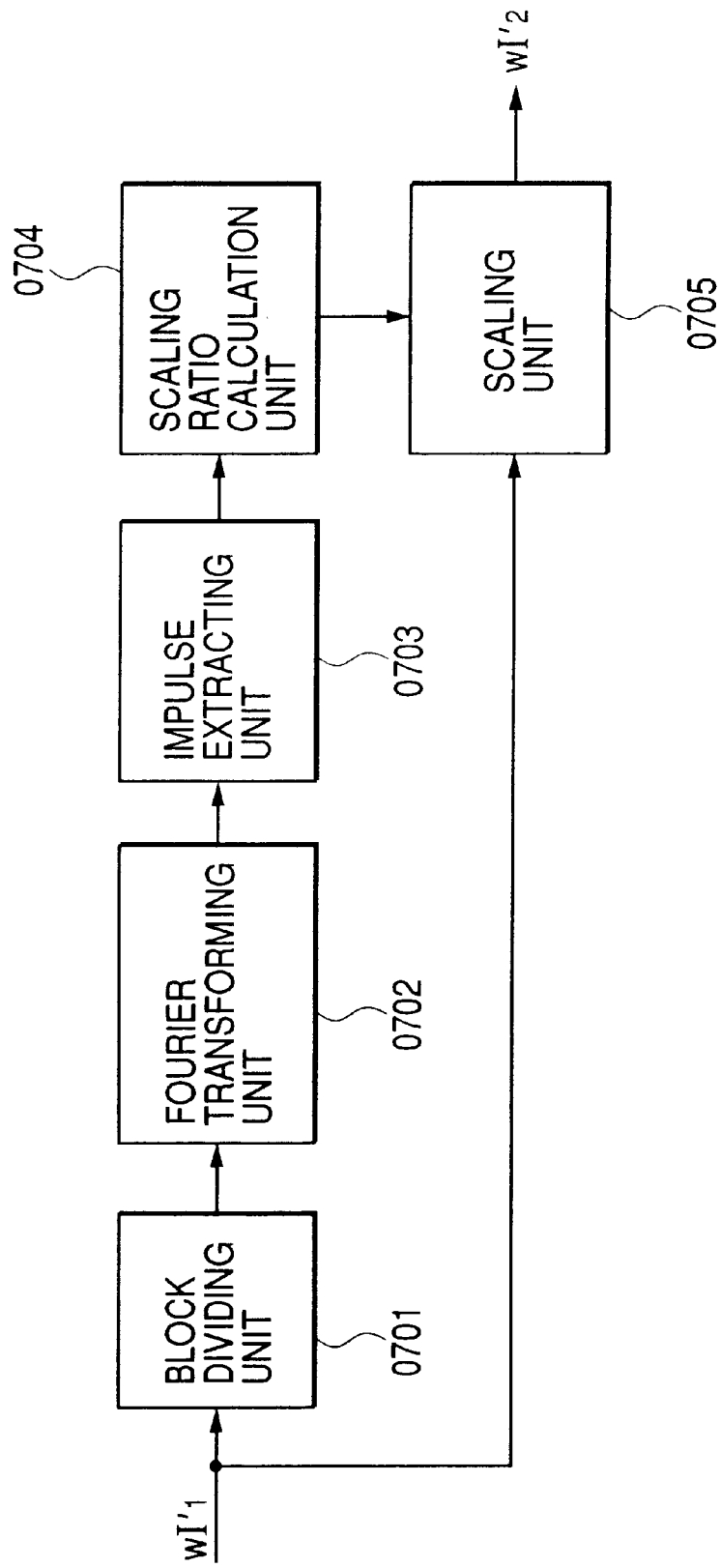

FIG. 8A
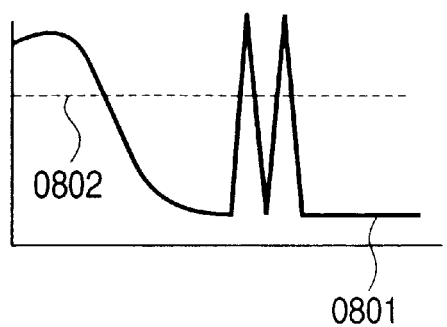
FIG. 8B
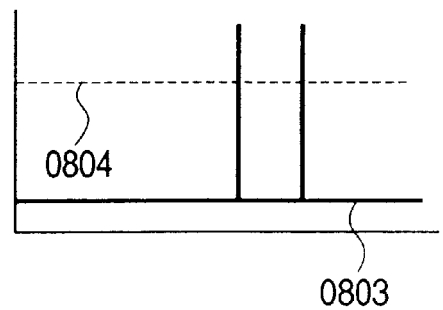
FIG. 9
| +c | +c | +c | +c | 0 | 0 | 0 | 0 |
|----|----|----|----|----|----|----|----|
| +c | +c | +c | +c | 0 | 0 | 0 | 0 |
| +c | +c | +c | +c | 0 | 0 | 0 | 0 |
| +c | +c | +c | +c | 0 | 0 | 0 | 0 |
| 0 | 0 | 0 | 0 | −c | −c | −c | −c |
| 0 | 0 | 0 | 0 | −c | −c | −c | −c |
| 0 | 0 | 0 | 0 | −c | −c | −c | −c |
| 0 | 0 | 0 | 0 | −c | −c | −c | −c |
0901

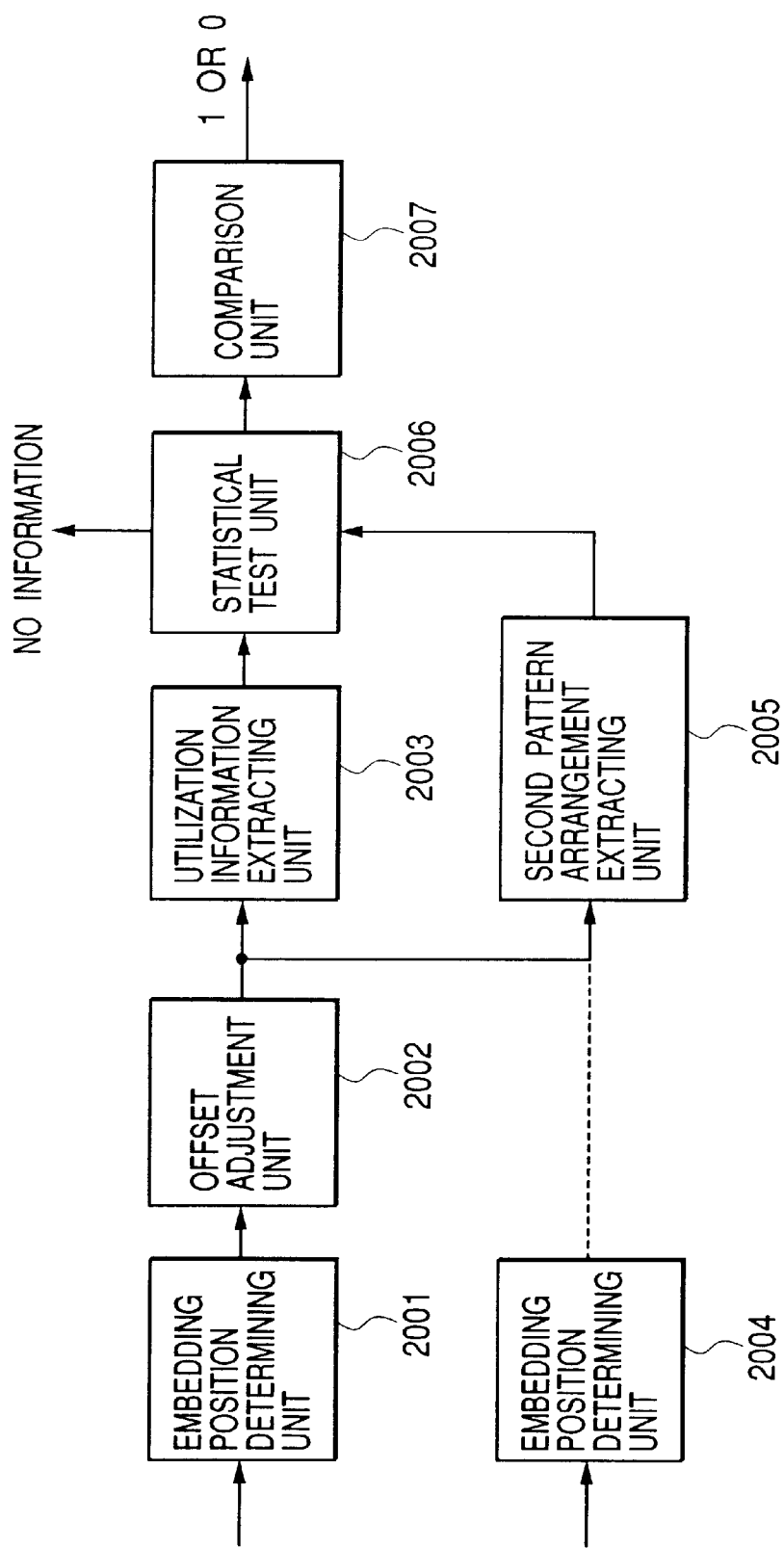

FIG. 21

| a00+C | a01+C | a02+C | a03+C | a04 | a05 | a06 | a07 |
|---|---|---|---|---|---|---|---|
| a10+C | a11+C | a12+C | a13+C | a14 | a15 | a16 | a17 |
| a20+C | a21+C | a22+C | a23+C | a24 | a25 | a26 | a27 |
| a30+C | a31+C | a32+C | a33+C | a34 | a35 | a36 | a37 |
| a40 | a41 | a42 | a43 | a44−C | a45−C | a46−C | a47−C |
| a50 | a51 | a52 | a53 | a54−C | a55−C | a56−C | a57−C |
| a60 | a61 | a62 | a63 | a64−C | a65−C | a66−C | a67−C |
| a70 | a71 | a72 | a73 | a74−C | a75−C | a76−C | a77−C |

$I''(x, y)$

⊗ CONVOLUTION

| +C | +C | +C | +C | 0 | 0 | 0 | 0 |
|---|---|---|---|---|---|---|---|
| +C | +C | +C | +C | 0 | 0 | 0 | 0 |
| +C | +C | +C | +C | 0 | 0 | 0 | 0 |
| +C | +C | +C | +C | 0 | 0 | 0 | 0 |
| 0 | 0 | 0 | 0 | −C | −C | −C | −C |
| 0 | 0 | 0 | 0 | −C | −C | −C | −C |
| 0 | 0 | 0 | 0 | −C | −C | −C | −C |
| 0 | 0 | 0 | 0 | −C | −C | −C | −C |

| a00 | a01 | a02 | a03 | a04 | a05 | a06 | a07 |
|---|---|---|---|---|---|---|---|
| a10 | a11 | a12 | a13 | a14 | a15 | a16 | a17 |
| a20 | a21 | a22 | a23 | a24 | a25 | a26 | a27 |
| a30 | a31 | a32 | a33 | a34 | a35 | a36 | a37 |
| a40 | a41 | a42 | a43 | a44 | a45 | a46 | a47 |
| a50 | a51 | a52 | a53 | a54 | a55 | a56 | a57 |
| a60 | a61 | a62 | a63 | a64 | a65 | a66 | a67 |
| a70 | a71 | a72 | a73 | a74 | a75 | a76 | a77 |

$I(x, y)$

⊗ CONVOLUTION

| +C | +C | +C | +C | 0 | 0 | 0 | 0 |
|---|---|---|---|---|---|---|---|
| +C | +C | +C | +C | 0 | 0 | 0 | 0 |
| +C | +C | +C | +C | 0 | 0 | 0 | 0 |
| +C | +C | +C | +C | 0 | 0 | 0 | 0 |
| 0 | 0 | 0 | 0 | −C | −C | −C | −C |
| 0 | 0 | 0 | 0 | −C | −C | −C | −C |
| 0 | 0 | 0 | 0 | −C | −C | −C | −C |
| 0 | 0 | 0 | 0 | −C | −C | −C | −C |

$P(x, y)$ $= 0$

FIG. 35
3801
FIRST
EMBEDDING
POSITION
REFERENCE
MASK
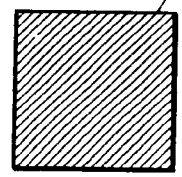
3802
SECOND
EMBEDDING
POSITION
REFERENCE
MASK
FIG. 36
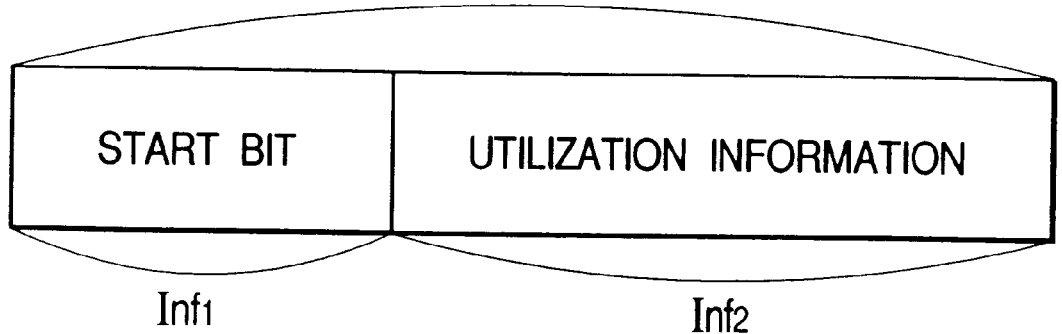

FIG. 37

| 69 | 211 | 9 | 217 | 16 | 35 | 190 | 101 |
|---|---|---|---|---|---|---|---|
| 87 | 197 | 109 | 180 | 117 | 212 | 71 | 114 |
| 166 | 28 | 55 | 143 | 104 | 146 | 85 | 130 |
| 64 | 206 | 179 | 48 | 240 | 232 | 108 | 154 |
| 67 | 40 | 91 | 224 | 37 | 32 | 223 | 194 |
| 203 | 214 | 106 | 231 | 169 | 4 | 208 | 24 |
| 47 | 195 | 27 | 61 | 2 | 155 | 81 | 213 |
| 251 | 84 | 202 | 184 | 170 | 10 | 46 | 138 |

FIG. 38

| 73 | 244 | 124 | 207 | 70 | 254 | 117 | 196 |
|---|---|---|---|---|---|---|---|
| 38 | 177 | 11 | 132 | 43 | 186 | 4 | 138 |
| 104 | 221 | 93 | 231 | 100 | 211 | 85 | 237 |
| 23 | 151 | 55 | 165 | 26 | 153 | 56 | 172 |
| 67 | 250 | 113 | 193 | 79 | 240 | 123 | 203 |
| 47 | 188 | 1 | 142 | 33 | 183 | 14 | 128 |
| 96 | 215 | 83 | 232 | 111 | 218 | 91 | 227 |
| 28 | 157 | 60 | 171 | 17 | 147 | 51 | 160 |

IMAGE PROCESSING APPARATUS AND METHOD AND STORAGE MEDIUM

BACKGROUND OF THE INVENTION

1. Field of the Invention

The present invention relates to an image processing apparatus and method for correctly extracting digital watermark information from image data having the digital watermark information embedded, and a storage medium for use with this method.

2. Related Background Art

In recent years, with the rapid development and spread of computers and networks, various kinds of information such as character data, image data or voice data are digitized and utilized. The digital information can be retained in its complete state permanently because of no degradation with a secular change over time, while it can be readily copied, and has the significant problem with the protection of copyright.

Therefore, security techniques for the protection of copyright are becoming increasingly important rapidly.

One of the techniques for protecting the copyright is a "digital watermark" technique. This digital watermark technique is one in which the name of a copyright holder or ID of a purchaser is embedded into the digital image data, voice data or character data in the form insensible to the human eyes to keep track of the unauthorized use due to illegal copy.

The digital watermark technique can be applied not only to the protection of copyright, but also to detecting a falsified position of digital data by embedding beforehand the information into digital data and coordinating the information with the digital data in accordance with the embedding rules.

The digital watermark technique typically relies on a method of embedding various kinds of information (digital watermark information) by applying alteration on the digital data to be insensible to the human eyes, and in the digital data having the digital watermark information embedded, three factors of "picture quality compared with the original", "endurance of digital watermark" and "embeddable amount of information" are closely related, and placed in the trade off relation from each other.

The "picture quality" corresponds to the degree of visual degradation of a digital watermark embedded image with respect to the original image. In the digital watermark technique, since the original image data is manipulated by a minute amount, if the digital watermark information is embedded, the embedded image may necessarily be degraded at the signal level from the original image. However, if this degradation is made insensible to the vision of the human, the embedded image becomes usable without losing the values of the original image. By embedding the digital watermark information, it is preferable that the visual image degradation may not occur.

The "endurance" corresponds to the degree at which the digital watermark information can be extracted later without error even when the digital watermark embedded image is subjected to various attacks. The attacks include the geometrical distortion such as enlargement, reduction or dislocation, non-reversible compression such as JPEG compression, partial cutting, noise addition, and density conversion. In a series of operations of outputting the digital watermark information embedded image onto the recording medium such as paper by the printer, inputting it by the scanner, and extracting the digital watermark information, those operations can be considered wholly or partially as the attacks if there is any possibility that the picture quality may change even slightly. It is preferred that the digital watermark information can be extracted correctly even if the image is subjected to these attacks.

The "embeddable amount of information" is defined as the amount of information which can be embedded as the digital watermark information. It is preferred that this embeddable amount of information is as large as possible.

There is the need for an algorithm of embedding the digital watermark information, in which the visual picture quality is not degraded by embedding the digital watermark information, the digital watermark information is endurable against various attacks, and the embeddable amount of information is large.

It is said that there is the trade off relation among those three parameters. For example, if the endurance against the attacks is raised, the image degradation may be aggravated, or the embeddable amount of information may be diminished. On one hand, if the image degradation is to be reduced, the endurance against the attacks may be diminished, or the embeddable amount of information may be reduced. On the other hand, if the embeddable amount of information is to be increased, the image degradation may be worsened, or the endurance against the attacks may be lessened.

Hence, when the digital watermark technique is developed, it is required to examine an optimal method in accordance with the situation where the digital watermark information is embedded.

Conventionally, a patchwork method is well known which is one method for embedding the digital watermark information. This patchwork method is one in which the values in a part of the image are incremented at will, while the values in the other part are decremented at will, so that some appendant information can be embedded while the values for the overall image are retained.

Conventionally, in extracting the digital watermark information from the digital watermark embedded image data by the patchwork method, it is necessary to know the embedding situation of the original image data from the digital watermark embedded image. However, there have been few methods that take into consideration such situation, and no technique has been yet established which extracts the digital watermark information correctly while inferring the situation of the original image data.

Also no technique has been established for correctly extracting the digital watermark information from the image data having the digital watermark embedded by various methods after the image data is subjected to an attack for causing geometrical distortion.

SUMMARY OF THE INVENTION

The present invention has been achieved to solve the above-mentioned problems, and its main object is to extract the digital watermark information from the digital watermark embedded image data as correctly as possible.

For example, this invention aims at extracting the digital watermark information as correctly as possible by inferring the state of the image data having no information embedded from the image data having the digital watermark information possibly embedded.

In order to attain the above object, according to a preferred embodiment of the present invention, there is provided an image processing apparatus for extracting the digital watermark information from the image data into which the digital watermark information has been embedded to be less visible to the human eyes, comprising a first extracting unit (similarly corresponding to a utilization information extracting unit 2003) for extracting the first information deriving the digital watermark information by performing an arithmetical operation on the image data using a first pattern arrangement (e.g., corresponding to a pattern arrangement of FIG. 9 in this embodiment), a second extracting unit (similarly corresponding to a second pattern arrangement extracting unit 2005) for extracting the second information indicating the state of the image data having no digital watermark information embedded by performing an arithmetical operation on the image data using a second pattern arrangement (similarly corresponding to a pattern arrangement of FIG. 36), and a test unit (similarly corresponding to a statistical test unit 2006) for testing the reliability of the first information extracted by the first extracting unit based on the second information.

Furthermore, for example, even if any geometrical distortion is applied to the image having the digital watermark information embedded, it is another object of the invention to accurately judging this distortion, and consequently to precisely extract the digital watermark information at a subsequent stage.

In order to attain the above object, according to another preferred embodiment of the invention, there is provided an image processing apparatus for extracting the digital watermark information from the image data into which the digital watermark information including the positional information has been embedded to be less visible to the human eyes, comprising a search unit for performing a process for extracting the positional information from the image data by multiple times at the different extracting start positions, a calculation unit for calculating the reliability indicating the probability of extracting the positional information for each information being extracted as the positional information by the search unit, and a discrimination unit for discriminating the position at which the digital watermark information is embedded in the image data, based on the reliability.

In order to solve the above-object in another way, according to a further embodiment of the invention, there is provided an image processing apparatus for extracting the digital watermark information from a registration signal indicating the geometrical state of the image data and the image data into which the digital watermark information has been possibly embedded to be less visible to the human eyes, comprising a transform unit for transforming the image data to the frequency data, a differentiation unit for differentiating a signal transformed by the transform unit, and a correction unit for performing the geometrical correction of the image data based on a signal differentiated by the differentiation unit and the information concerning the registration signal.

Other objects and features of the present invention will be described below from the ensuing description of the embodiments and the accompanying drawings.

BRIEF DESCRIPTION OF THE DRAWINGS

FIG. 7 is a block diagram of a scale adjustment unit;

FIGS. 8A and 8B are explanatory views for explaining the extraction of a registration signal;

FIG. 9 is a diagram illustrating a pattern arrangement for use in embedding and extracting appendant information;

FIG. 20 is a block diagram of an appendant information extracting unit;

FIG. 21 is an explanatory diagram for explaining how to extract the appendant information Inf;

FIG. 22 is an explanatory diagram for explaining an extracting operation which is attempted notwithstanding the appendant information Inf does not exist;

FIG. 35 is a diagram illustrating first and second position reference masks;

FIG. 36 is a view showing a configuration of appendant information Inf;

FIG. 37 is a diagram illustrating an example of a coefficients within a blue noise mask; and FIG. 38 is a diagram illustrating an example of the coefficients within a cone mask.

DETAILED DESCRIPTION OF THE PREFERRED EMBODIMENTS

The preferred embodiments of the present invention will be described below.

[1. Digital Watermark Embedding Apparatus]

The outline of a digital watermark embedding apparatus according to an embodiment of the invention will be described below with reference to the drawings.

Figure 1:
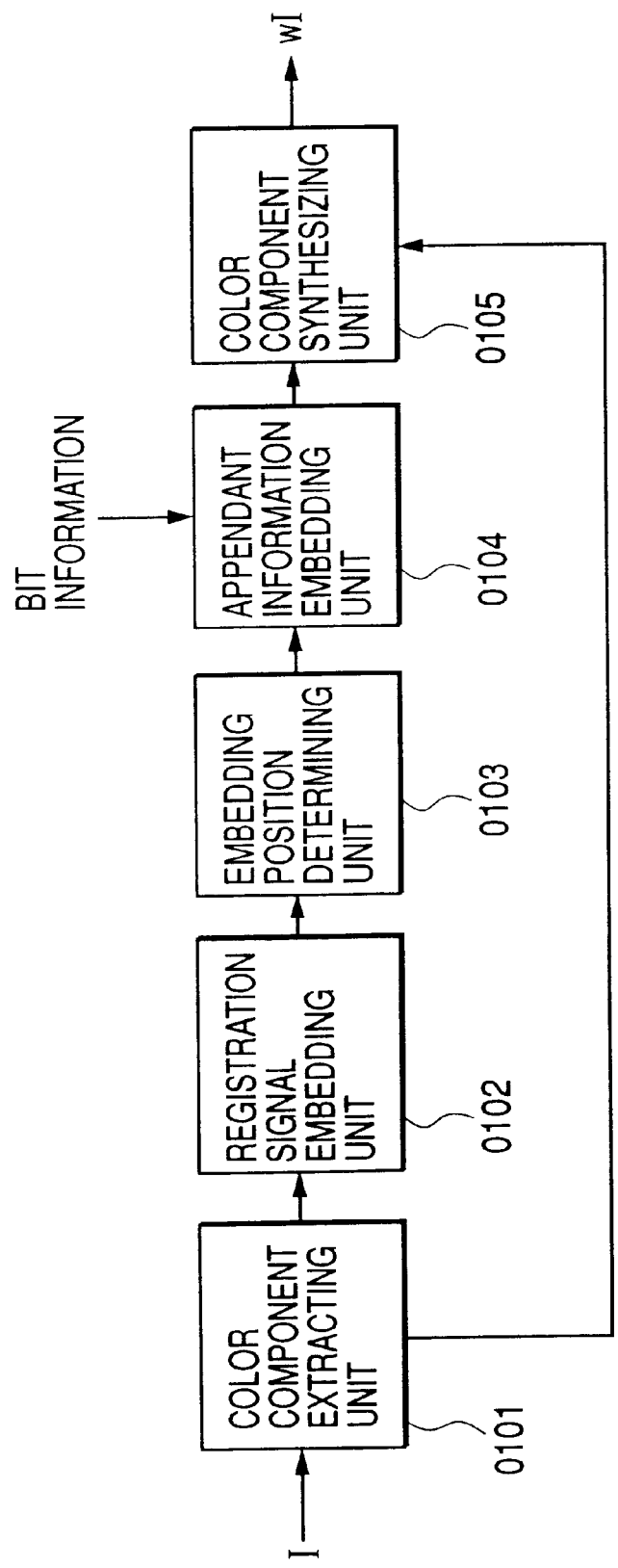
FIG. 1 is a block diagram of an overall configuration of a digital watermark embedding apparatus.

FIG. 1 shows a digital watermark embedding unit in this embodiment. As shown in FIG. 1, the digital watermark embedding apparatus comprises a color component extracting unit 0101, a registration signal embedding unit 0102, an embedding position determining unit 0103, an appendant information embedding unit 0104, and a color component synthesizing unit 0105.

The image data I is input into the digital watermark embedding apparatus. This image data is multi-valued image data having a predetermined number of bits per pixel. In this embodiment, the input image data I may be gray scale image data or color image data. The gray scale image data comprises one kind of element per pixel, and the color image data consists of three kinds of elements per pixel. The three kinds of elements include a red component, a blue component and a green component in this embodiment. However, the present invention is applicable to another combination of color components.

The image data I input into the digital watermark embedding apparatus is first passed into the color component extracting unit 0101.

In the case where the input image data I is color image data, the blue component is only separated from this color image data in the color component extracting unit 0101, and output to the registration signal embedding unit 0102 at the next stage.

On one hand, other color components are output to the color component synthesizing unit 0105 at the last stage. Herein, a color component into which the digital watermark information is embedded is only separated and forwarded to a digital watermark processing system.

In this embodiment, the digital watermark information is embedded into the blue component. This is because the blue component is the least sensitive to the vision of human among the red component, the blue component and the green component. Hence, embedding the digital watermark information into the blue component is more effective than embedding the digital watermark information into other color components, in that the image degradation due to digital watermark information is less sensible to the human eyes.

In the case where the input image data I is gray scale image data, the color component extracting unit 0101 once converts the gray scale image data into the pseudo color image data. Herein, the pseudo color image data is color image data consisting of three kinds of elements per pixel, although the values of three kinds of elements are all equal. The gray scale image data is converted into the pseudo color image data, and the blue color component is separated from the color image data, and output to the registration signal embedding unit 0102.

On the other hand, other color components are output to the color component synthesizing unit 0105 at the last stage. In this way, the digital watermark information is embedded into the blue component in the same manner as the color image data.

In the subsequent explanation, no distinction is made if possible between the case where the image data I is color image data and the case where the image data I is gray scale image data. Namely, the color image data and the pseudo color image data are not distinguished.

The registration signal embedding unit 0102 will be described below. Herein, a registration signal is required to correct a geometrical distortion of the image data as a preprocess of extracting the digital watermark information.

The image data of blue component obtained by the color component extracting unit 0101 is input into the registration signal embedding unit 0102. The registration signal embedding unit 0102 embeds a registration signal into the image data using a sort of digital watermark technique. That is, in the image data having the registration signal embedded, the registration signal can not be sensed by the vision of human. A method of embedding this registration signal will be detailed later.

The registration signal embedding unit 0102 outputs the registration signal embedded image data.

The embedding position determining unit 0103 at the next stage determines the embedding position of the appendant information Inf in the image data input from the registration signal embedding unit 0102.

The embedding position determining unit 0103 output the control data representing the embedding position of the appendant information Inf in the image, together with the input image data, to the appendant information embedding unit 0104.

The appendant information embedding unit 0104 inputs the appendant information Inf (bit information consisting of plural bits), as well as the image data and the control data. This appendant information Inf is embedded into the embedding position determined in the image data of blue component, using a digital watermark technique. A method of embedding the appendant information Inf using the digital watermark technique will be described later.

The image data having the appendant information Inf embedded is output from the appendant information embedding unit 0104, and input into the color component synthesizing unit 0105.

The color component synthesizing unit 0105 synthesizes the blue component processed up to the previous stage (appendant information embedding unit 0104) and the red component and the green component directly input from the color component extracting unit 0101 into the ordinary form of color image data.

Through the above process, the image data wI having the registration signal and the appendant information Inf embedded by using the digital watermark technique is output.

In this embodiment, it is supposed that various attacks for causing the geometrical distortion in the image data wI are applied to the image data. For example, a purposive edit operation of the image by the user, or an operation of scanning the printed matter with a scanner after printing the image data wI. The image data subjected to the attack is wI' of FIG. 2 as will be described later.

Figure 31:
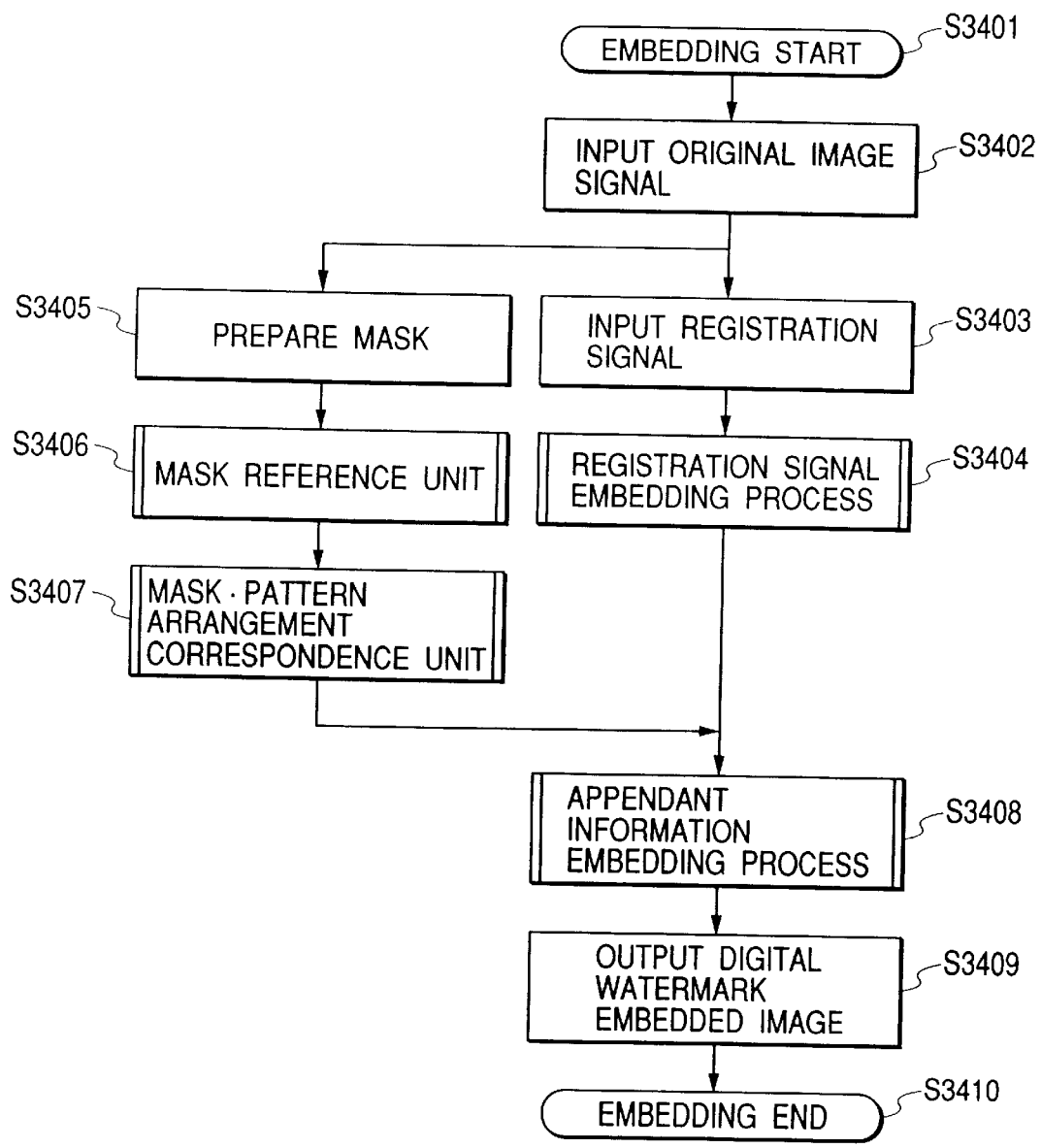
FIG. 31 is a flowchart showing the whole of a digital watermark embedding process.

An overall flow of the units as described above will be described below using a flowchart of FIG. 31.

First, at step 3402, the image data I is input into the color component extracting unit 0101. This step includes reading a photo or printed matter with a scanner and creating the image data. Further, the blue component is separated, and used for the input of a registration signal at the later stage.

At step 3403, the registration signal is generated, and embedded at step 3404. A registration signal embedding process at step 3404 corresponds to a process of the registration signal embedding unit 0102 in FIG. 1, and will be described later in detail.

Further, a mask is created at step 3405, and the created mask is referenced at step 3406 to define the relation between the embedding bit information and the embedding position. At step 3407, the mask is extended to an expanded mask. This mask pattern arrangement correspondence unit will be also described later in detail.

At step 3408, the appendant information Inf is embedded into the image data having the registration signal embedded at steps 3403 and 3404.

This appendant information embedding process is performed by embedding the appendant information Inf into the overall image in a unit of macro block repetitively. This process will be discussed later in detail in connection with FIG. 10. As used herein, the macro block indicates a minimum embedding unit, in which all the one complete appendant information Inf is embedded into an image area corresponding to this macro block.

After the appendant information Inf is embedded into the image data, the digital watermark embedded image data wI is output at step 3409.

Figure 32:
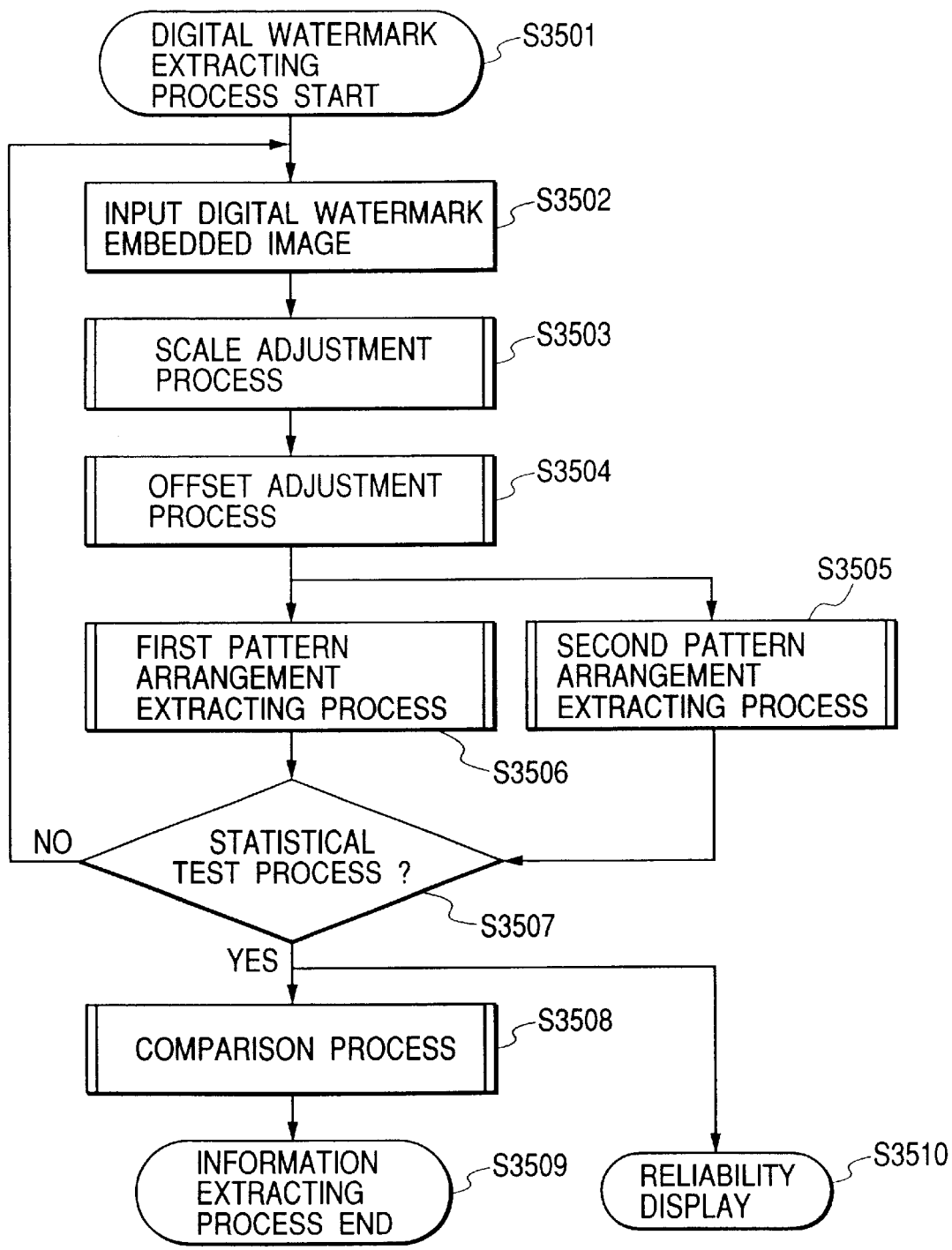
FIG. 32 is a flowchart showing the whole of a digital watermark extracting process.

As described above, this image data wI may be subjected to various attacks for causing the geometrical distortion before executing the digital watermark extracting start process in FIG. 32.

[2. Digital Watermark Extracting Unit]

Next, the outline of a digital watermark extracting apparatus according to this embodiment of the invention will be described below with reference to the drawings.

Figure 2:
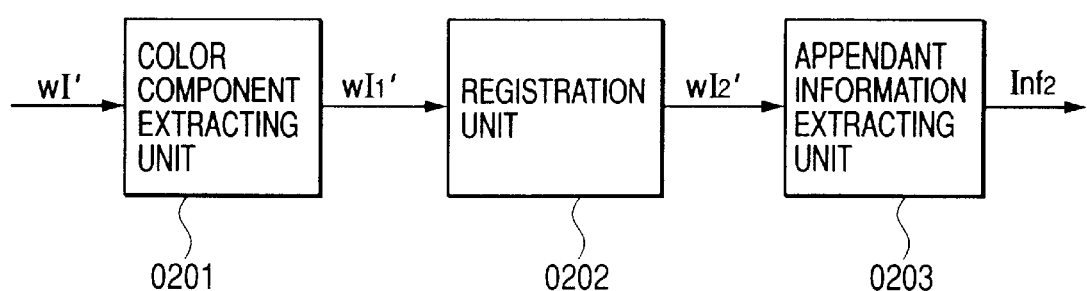
FIG. 2 is a block diagram of an overall configuration of a digital watermark extracting apparatus.

FIG. 2 shows a digital watermark extracting unit in this embodiment. As shown in FIG. 2, the digital watermark extracting apparatus comprises a color component extracting unit 0201, a registration unit 0202, and an appendant information extracting unit 0203.

The image data wI' is input into the digital watermark extracting apparatus. This image data wI' is the image data wI which have been possibly subjected to various attacks for causing the geometrical distortion. The attacks include the non-reversible compression such as JPEG compression, scaling, rotation, printing and scanning, and a combination of them.

Accordingly, the image data wI' and the image data wI are ideally identical in the contents, but practically, two contents of these image data may be often quite different.

The color component extracting unit 0201 inputs the image data wI', extracts the blue component, and outputs the image data of blue component to the registration unit 0202 at the net stage. Of the image data wI', the red component and the green component other than the blue component are unnecessary and abolished here.

The image data wI' of blue component extracted by the color component extracting unit 0201 is input into the registration unit 0202. And using the image data $wI_1'$ of blue component, the image data $wI_2'$ corrected for the geometrical distortion is produced.

As described above, the image data wI' and the image data wI may have possibly the different scales, while the image data $wI_2'$ and the image data wI have of necessity the same scale. The reason and the details for a process for making the image data $wI_2'$ and the image data wI the same scale will be described later.

The registration unit 0202 outputs the image data $wI_2'$ to the appendant information extracting unit 0203.

The appendant information extracting unit 0203 can extract the digital watermark information embedded into the image data $wI_2'$ by performing a predetermined process in accordance with an embedding method for the appendant information embedding unit 0104, and outputs the extracted appendant information Inf.

An overall flow of the units as described above will be described below using a flowchart of FIG. 32.

First, at step 3502, the image data wI' is input. This image data wI' can be obtained by reading the image data that is expected as the image data wI from a network or memory, or scanning the printed matter based on the image data wI with a scanner. In the latter case, there is the high possibility that the image data wI' is quire different from the image data wI.

Further, the blue component of this image data wI' is only extracted, and used at the next step.

At step 3503, the scale for the input image data $wI_1'$ of blue component is corrected.

Further, at step 3504, the offset for the input image data $wI_1'$ of blue component is corrected.

An extracting process using a first pattern arrangement at step 3506, or an extracting process using a second pattern arrangement at step 3505 is performed to extract the embedded appendant information Inf from the image data $wI_2'$ already corrected for the scale and the offset.

At step 3507 for the statistical test, the probability of the digital watermark information extracted above is calculated and judged. If it is judged that the digital watermark information is not correct, the procedure returns to step 3502, where the image possibly having the digital watermark information embedded is input again. On the other hand, if it is judged that the digital watermark information is sufficiently correct, the digital watermark information (appendant information Inf) is extracted in a comparison process at step 3508. At step 3510, the probability information is displayed as a reliability index D as will be described later.

[3. Detailed Explanation of the Units]

Next, each of the units will be described below in detail.

First, the registration unit 0202 on the digital watermark extracting side and the registration process at step 3503 will be described below.

The registration process is a preprocess for enabling the digital watermark information to be extracted from the image data wI' input into the digital watermark extracting apparatus, in extracting the digital watermark information. In the following, it is first considered how the image data subjected to a process of the printing system undergoes changes. Then, the registration process for such changes, and the registration process for the printing system, will be considered.

The image data wI output from the digital watermark embedding apparatus is not necessarily input directly into the digital watermark extracting apparatus.

For example, a case will be considered in which the image data wI is printed by a YMCK ink jet printer, and the printed matter is scanned by a scanner.

In the case where the output resolution of the printer and the input resolution of the scanner are different, the original color image data wI and the scanned image data may have different scales. Hence, there is less possibility that the digital watermark information can be correctly extracted directly from the obtained image data wI'. Accordingly, there is a need of providing a correction unit for correcting for a difference between these scales.

In this embodiment, since both the input resolution and the output resolution are known, the ratio of scale can be calculated from the ratio of the input resolution to the output resolution. For example, in the case where the output resolution is 600 dpi and the input resolution is 300 dpi, the ratio of scale between the image before printing and the image after scanning is 2. Therefore, the image data wI' is scaled in accordance with the calculated scale, using a suitable scaling algorithm. Thereby, the image data wI and the image data wI' can be made the same scale in the image size.

However, the output and input resolutions are not necessarily known in all cases. In the case where both the resolutions are not known, the above method can not be used. In this case, there is further a need of providing a unit for recognizing the ratio of scale in addition to the correction unit for correcting for a difference between scales.

Figure 3:
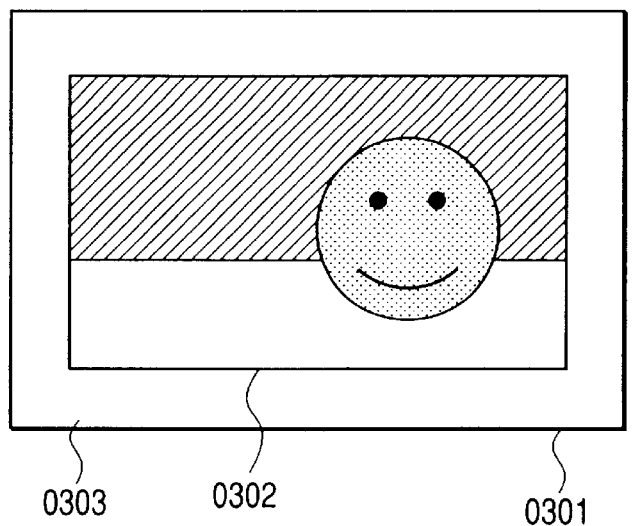
FIG. 3 is a view illustrating an example of image data produced on an extraction side in a printing process.

In the case where the image data wI has been subjected to the printing process, the image is as shown in FIG. 3, after being input by scanning with a scanner. In FIG. 3, the whole area as indicated at 0301 is an image represented by the image data wI'. This image data 0301 is comprised of an essential image 0302 represented by the image data wI and a white blank margin 0303. Such margin becomes incorrect if the user cuts away the image using a mouse.

The above points are considered to take place of necessity in the image represented by the image data wI' obtained via the printing system. And when the image data wI is subjected to the printing process, those points must be solved.

Thus, there has been described the case where the image data is obtained though at least one printing process before extracting the digital watermark. However, such a situation may occur by artificially editing the image.

Supposing the case where the ratio of input and output resolutions is unknown, the registration signal embedding unit and the registration unit provided to solve the above problems will be described below.

[3-1 Registration Signal Embedding Process]

First, the registration signal embedding unit 0102 (step 3404) will be described below.

The registration signal embedding unit 0102 is situated at the previous stage of the appendant information embedding unit 0104. This registration signal embedding unit 0102 embeds in advance a registration signal referred to for the registration of the image data wI' in the registration unit of FIG. 2 into the original data. This registration signal as the digital watermark information is less visible to the human eyes and embedded into the image data (the blue component of color image data in this embodiment).

Figure 4:
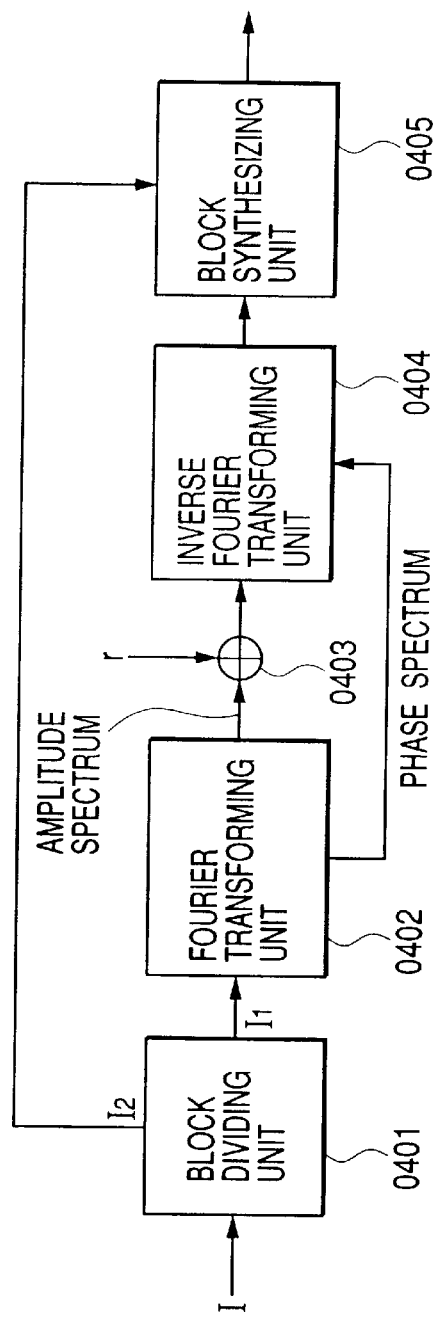
FIG. 4 is a block diagram of a registration signal embedding unit.

FIG. 4 shows the internal configuration of the registration signal embedding unit 0102. The registration signal embedding unit 0102 comprises a block dividing unit 0401, a Fourier transforming unit 0402, an adder unit 0403, an inverse Fourier transforming unit 0404, and a block synthesizing unit 0405, as shown in FIG. 4. These units will be described below in detail.

The block dividing unit 0401 divides the input image data into a plurality of blocks which do not overlap each other. The size of this block is determined to be the power of 2 in this embodiment. Actually, other sizes may apply, but in the case where the block size is the power of 2, the fast process can be made in the Fourier transforming unit 0402 that is connected after the block dividing unit 0401.

The blocks divided by the block dividing unit 0401 are classified into two sets $I_1$ and $I_2$, in which a set $I_1$ is input into the Fourier transforming unit 0402 at the next stage and a set $I_2$ is input into the block synthesizing unit 0405 at the last stage. In this embodiment, one of the blocks obtained by the block dividing unit 0401 that is located closest to the center among the image data I is selected as the set $I_1$, and all the remaining blocks are selected as the set $I_2$.

This is due to the fact that this embodiment can be materialized by using at least one block, and the processing time can be shortened by having fewer blocks. However, the present invention is not limited to this embodiment, but is applicable to the case where the set $I_1$ comprises more than one block.

The information as to in what size the image data is to be divided into blocks, and which block is to be selected to the object of embedding the registration signal is required to be commonly used in the digital watermark embedding apparatus and the digital watermark extracting apparatus.

The set $I_1$ of the image data obtained by the division of the block dividing unit 0401 is input into the Fourier transforming unit 0402.

Next, the Fourier transforming unit 0402 subjects the input image data $I_1$ to the Fourier transformation. The original data form of the input image data $I_1$ is referred to as a spatial region, while the data form after the Fourier transformation is referred to as a frequency region. The Fourier transformation is applied to all the input blocks. In this embodiment, the fast Fourier transform is used to speed up the processing, because the size of the input blocks is the power of 2.

The fast Fourier transform is a transformation algorithm which is executable with an amount of arithmetic operations of $(n/2)\log_2(n)$, while the Fourier transform requires an amount of arithmetic operations of n×n. Here, n is a positive integer. The fast Fourier transform and the Fourier transform are only different in the speed of providing the calculation result, but give the same result. In this embodiment, the fast Fourier transform and the Fourier transform are not distinguished.

The image data in the frequency region obtained by the Fourier transform can be represented by an amplitude spectrum and a phase spectrum. Of them, the amplitude spectrum is only input into the adder unit 0403. On the other hand, the phase spectrum is input into inverse Fourier transform unit 0404.

Next, the adder unit 0403 will be described below. A signal r called a registration signal is separately input, together with the amplitude spectrum, into the adder unit 0403. The examples of the registration signal include an impulse signal as shown in FIG. 5.

Figure 5:
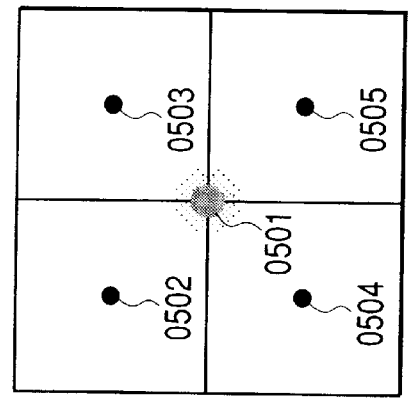
FIG. 5 is an explanatory view for explaining a registration signal.

In FIG. 5, the amplitude spectrum among the two dimensional spatial frequency components obtained by the Fourier transform is only shown. The center is a low frequency component, and the surroundings are high frequency components. Reference numeral 0501 denotes the amplitude spectrum of a signal component which the intrinsic image component has, and in the signal corresponding to a natural image such as a photo, a lot of large signals are concentrated in the low region. On the other hand, few signals are present in the high region.

In this embodiment, it is supposed that the natural image is subjected to the processes. However, the present invention is not limited to the natural image, but is also usable for the text image or CG image. However, this embodiment is quite effective to the natural image having relatively many intermediate gradations.

FIG. 5 shows one example in which for the signal 0501 which the natural image essentially possesses, the impulse signals 0502, 0503, 0504 and 0505 are added to the horizontal and vertical Nyquist frequency components of the signal in the frequency region. Like this example, the registration signal is desirably the signal of impulse nature. This is because the registration signal is only liable to extraction in the digital watermark extracting apparatus as will be described later.

In FIG. 5, the impulse signals are added to the Nyquist frequency components of an input signal, but the present invention is not limited thereto. That is, in the case where the digital watermark embedded image is attacked, it is required that the registration signal may not be eliminated. As described above, the JPEG compression that is non-reversible has the effect of a low pass filter. Therefore, if the impulse signals are embedded into the high frequency components which are subjected to compression, they may be eliminated through the compression and expansion process.

On the other hand, there is the inconvenience that embedding of impulses into the low frequency components is more likely to be sensed as the noise by the vision characteristic of the human eyes than embedding into the high frequency components. Hence, in this embodiment, the impulse signals are embedded into the intermediate frequency components that are higher than a first frequency less sensible by the vision of the human eyes and lower than a second frequency easily not removed through a non-reversible compression and expansion process. This registration signal is added to the blocks (or a block in this embodiment) input into the adder unit 0403.

The adder unit 0403 outputs the registration signal added to the amplitude spectrum of image data in the frequency region to the inverse Fourier transforming unit 0404.

The inverse Fourier transforming unit 0404 subjects the input image data in the frequency region to the inverse Fourier transformation. This inverse Fourier transform is performed for all the input blocks. Since the size of the input blocks is the power of 2, like the Fourier transforming unit 402, the fast Fourier transform is used to speed up the processing. The signal in the frequency region that is input into the inverse Fourier transform unit 0404 is transformed into the signal in the spatial region by the inverse Fourier transform, and output.

The image data in the spatial region that is output from the inverse Fourier transform unit 0404 is input into the block synthesizing unit 0405.

The block synthesizing unit 0405 performs a reverse process of the division made by the block dividing unit 0405. As a result of the processing of the block synthesizing unit 0405, the image data (of blue component) is reconstructed and output.

The details of the registration signal embedding unit 0102 as shown in FIG. 1 has been described above.

In FIG. 4, the method of embedding the registration signal into the Fourier transform region has been described. On the other hand, another method of embedding the registration signal into the spatial region can be conceived. This method will be described below with reference to FIG. 29.

Figure 29:
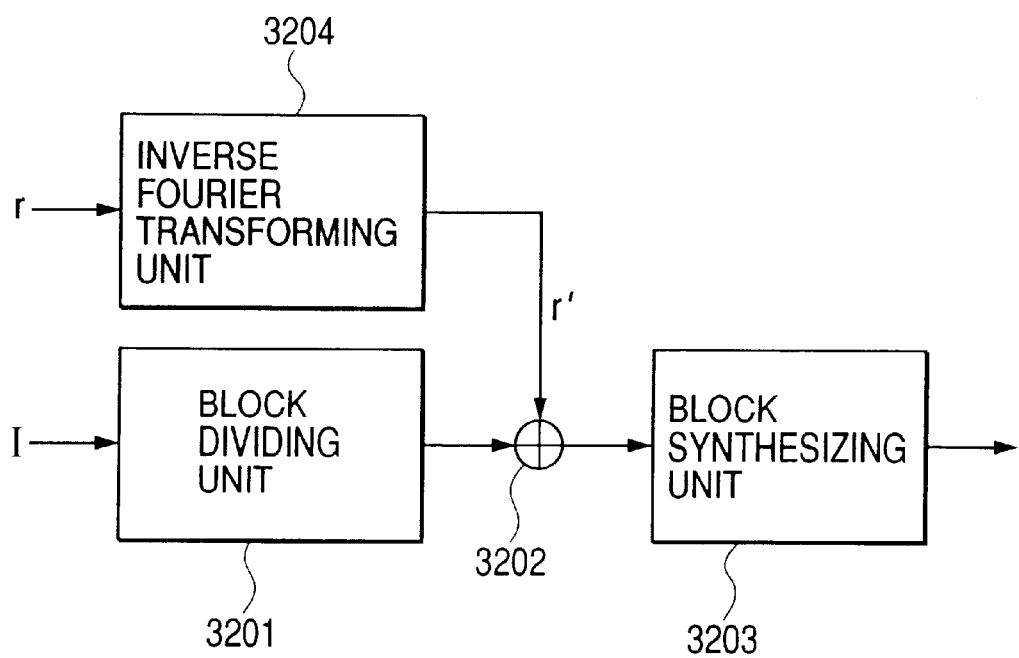
FIG. 29 is a block diagram of a registration signal embedding unit in the spatial region.

FIG. 29 shows a block dividing unit 3201, an adder unit 3202, a block synthesizing unit 3203, and an inverse Fourier transforming unit 3204.

The block dividing unit 3201 and the block synthesizing unit 3203 perform the same operation as the block dividing unit 0401 and the block synthesizing unit 0405 as shown in FIG. 4, respectively. The image data to be input into the registration signal embedding unit 0102 is first input into the block dividing unit 3201 and divided. The blocks obtained by the block dividing unit 3201 are input into the adder unit 3202. On the other hand, the registration signal r is input into the inverse Fourier transform unit 3204, and converted into a signal r' through the inverse Fourier transform process. Herein, the registration signal r is a signal in the frequency region, like the signal as shown in FIG. 5. The blocks from the block dividing unit 3201 and the signal r' from the inverse Fourier transform unit 3204 are input into the adder unit 3202, and added. A signal output from the adder unit 3202 is input into the block synthesizing unit 3203, where the image data (blue component) is reconstructed and output.

The configuration of the units as shown in FIG. 29 is the same configuration of the units as shown in FIG. 4, and employed in the spatial region. Unlike the configuration of FIG. 4, there is no need of the Fourier transform unit, and the fast process can be made.

In FIG. 29, the signal r' is independent of the input image data I. Hence, there is no need of performing the calculation of signal r', namely, the process of the inverse Fourier transform unit 3204, every time the image data I is input, and it is possible to create beforehand the signal r'. In this case, it is possible to remove the inverse Fourier transform unit 3204 from the configuration of the units in FIG. 29, and embed the registration signal rapidly. A registration process for referring to this registration signal will be described later.

<Patchwork Method>

This embodiment employs a principle referred to as a patchwork method to embed the appendant information Inf. Thus, the principle of patchwork method will be described below.

In the patchwork method, the appendant information Inf is embedded by giving rise to a statistical bias in the image.

Figure 30:
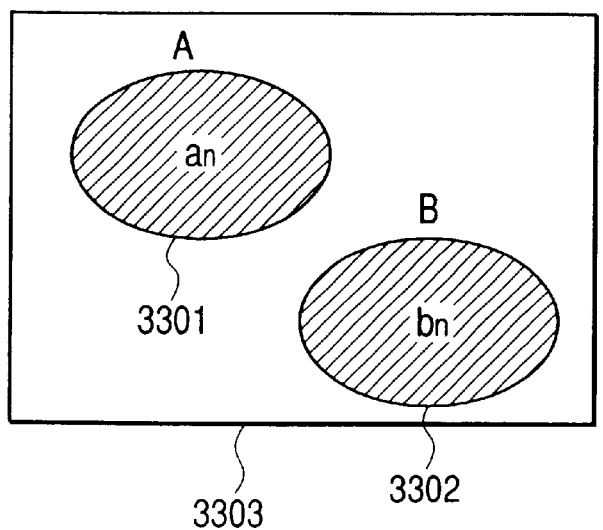
FIG. 30 is an explanatory view for explaining two sets in a patchwork method.

This statistical bias will be described below with reference to FIG. 30. In FIG. 30, reference numerals 3301, 3302 denote a partial set of pixels, and 3303 denotes the entire image. Two partial sets A denoted by 3301 and B denoted by 3302 are selected from the entire image 3303.

A selection method of these two partial sets enables the appendant information Inf to be embedded by the patchwork method in this embodiment so far as they do not overlap each other. However, the size and the selection method of these partial sets have a significant effect on the endurance of the appendant information Inf embedded by the patchwork method, namely, the strength for holding the appendant information Inf when the image data wI is subjected to an attack. This respect will be described later.

Suppose that the selected elements of the partial set A are valued in $\{a_n\}$, and the element of the partial set B are valued in $\{b_n\}$. More specifically, $\{a_n\}$ and $\{b_n\}$ are values of pixels contained in the partial sets (corresponding to the blue component in the color image data in this embodiment).

Herein, an index d is defined such as $$d = 1/N \Sigma (a_i - b_i)$$

This index represents a difference in pixels between two sets that is expected.

For the typical natural image, if appropriate partial sets A and B are chosen, and an index d is defined, a property $$d \approx 0$$

is demonstrated. In the following, d is called the reliability distance.

On the other hand, embedding the bits making up the appendant information Inf is performed such as $$a'_i = a_i + c$$

$$b'_i = b_i - c$$

This operation is performed by adding the value c to all the elements of the partial set A and subtracting the value c from all the elements of the partial set B.

Herein, partial sets A and B are selected in the same way as previously described from the appendant information Inf embedded image to calculate the index d.

Then, $$d = 1/N \Sigma (a'_i - b'_i)$$

$$= 1/N \Sigma \{(a_i + c) - (b_i - c)\}$$

$$= 1/N \Sigma (a_i - b_i) + 2c$$

$$= 2c$$

d is not equal to 0.

That is, when an image is given, no appendant information Inf is embedded if d≈0 by calculating the reliability distance d for the image, while if d is separated more than a certain amount from 0, it is judged that the appendant information Inf is embedded.

The basic idea of the patchwork method has been described above.

Applying the principle of the patchwork method, the information of a plurality of bits is embedded in this embodiment. With this patchwork method, selecting the partial set A and the partial set B is defined by the pattern arrangement.

In the above patchwork method, embedding the appendant information Inf is implemented by adding or subtracting the elements of the pattern arrangement to or from the certain elements of the original image.

A simple example of the pattern arrangement is shown in FIG. 9. FIG. 9 shows the pattern arrangement of change values from the original image, when 8×8 pixels are referenced to embed one bit. As in FIG. 9, the pattern arrangement consists of the elements having positive value, the elements having negative value, and elements having a value of 0.

In the pattern of FIG. 9, at the position represented by an arrangement element of +c, the pixel value at the corresponding position is incremented by c, and the position represented by the arrangement element of +c corresponds to the partial set A. On the other hand, at the position represented by an arrangement element of −c, the pixel value at the corresponding position is decremented by c, and the position represented by the arrangement element of −c corresponds to the partial set B. The position represented by 0 corresponds to other than the partial sets A and B, as described above.

In this embodiment, the number of arrangement elements having positive value and the number of arrangement elements having negative value are equal so as not to change the overall density of the image. That is, in one pattern arrangement, the sum of all the arrangement elements is equal to 0. This condition is necessary when an extracting operation of the appendant information Inf is performed.

Using the above pattern arrangement, an embedding operation of the information of bits making up the appendant information Inf is performed.

In this embodiment, a plurality of pieces of bit information, i.e., the appendant information Inf are embedded by arranging a plurality of patterns of FIG. 9 in different areas of the original image data to increment or decrement the pixel values. In other words, supposing the combinations of partial sets A and B, partial sets A' and B', partial sets A" and B", and so on, the appendant information Inf consisting of a plurality of bits are embedded into different areas of one image.

In this embodiment, when the original image data is large, the appendant information Inf is embedded repetitively. This is due to the fact that because the patchwork method uses the statistical property, it is necessary to have the appendant information Inf sufficient to exhibit the statistical property.

In this embodiment, in embedding a plurality of bits, the relative positions between bits to use the pattern arrangement are determined in advance so that the areas for changing the pixels using the pattern arrangement do not overlap. That is, the pattern arrangements with which the information at the first bit making up the appendant information Inf and the information at the second bit are embedded are placed in appropriate positional relation.

For example, for the appendant information Inf of 16 bits, the positional relation of the pattern arrangement of 8×8 pixels at the first to sixteenth bit is such that there is less image degradation in the area of a size larger than 32×32 pixels.

Further, the appendant information Inf (or bit information making up this appendant information Inf) is embedded as many times as possible in the case where the image data is large. This is intended to extract correctly each bit of the appendant information Inf. In particular, in this embodiment, since the statistical measurement is made using the same appendant information Inf repetitively embedded, the repetitive embedding is important.

The selection of the embedding position as described above is performed in the embedding position determining unit 0103 in FIG. 1. Next, the operation of this embedding position determining unit will be described below.

[3-2 Embedding Position Determining Process]

Figure 11:
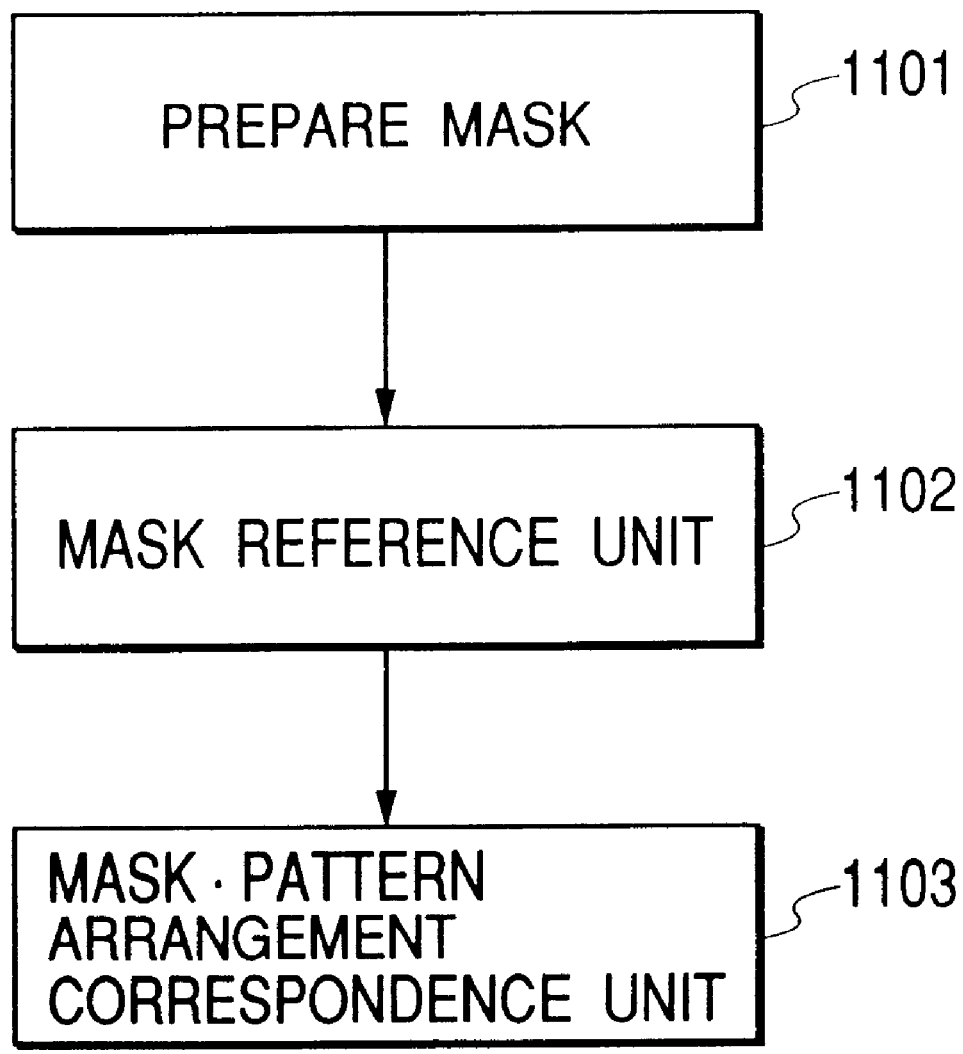
FIG. 11 is a block diagram of an embedding position determining unit.

FIG. 11 shows the internal configuration of the embedding position determining unit 0103.

A mask preparing unit 1101 of FIG. 11 prepares a mask for defining the embedding position of each bit information making up the appendant information Inf. The mask means the pattern arrangement (see FIG. 9) corresponding to each bit information that is a matrix comprising the positional information for defining the relative arrangement of each bit information.

Figure 17:
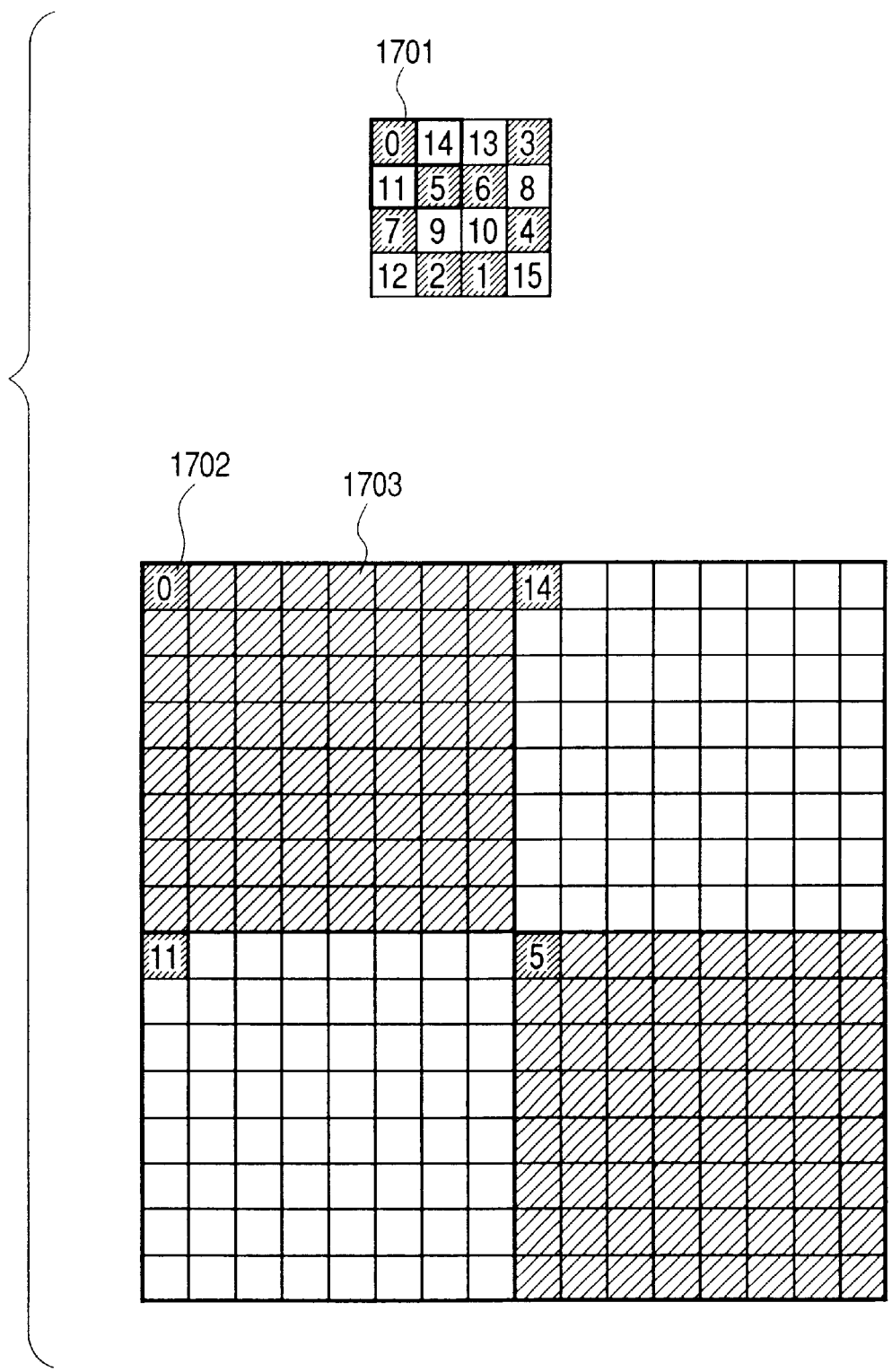
FIG. 17 is a diagram showing how to develop each pattern arrangement over the position reference mask of FIG. 16.

FIG. 17 shows an example of the mask at 1701. Inside the mask, the coefficient values are assigned, each coefficient value being the equal appearance frequency within the mask. If this mask is used, it is possible to embed the appendant information Inf consisting of 16 bits at maximum.

Next, a mask reference unit 1102 reads a mask prepared by the mask preparing unit 1101, and determines the method of disposing the pattern arrangement to embed each bit information by associating each coefficient value within the mask with the information concerning at which position each bit information is located.

Further, a mask pattern arrangement correspondence unit 1103 develops the arrangement elements (8×8 in size) of each pattern arrangement at a position of each coefficient value within the mask. That is, each coefficient value (one square) of the mask as indicated at 1701 in FIG. 17 is developed 8×8 times as indicated at 1703 in the same figure and referenced as the embedding position of each pattern arrangement.

An appendant information embedding unit 0104 as will be described later refers to the embedding top coordinate 1702 in FIG. 17 and embeds each bit information using the pattern arrangement.

In this embodiment, every time the image data is input into the mask preparing unit 1101, the mask is prepared. Hence, when a large size of the image data is input, the same appendant information Inf is embedded multiple times repetitively.

In the above method, when the appendant information Inf is extracted from the image, the configuration of the mask (array of coefficient values) plays a key role. That is, the holder of a key can only extract the information.

The present invention may comprise the instance of storing a prepared mask in an internal storage of the mask preparing unit 1101 without preparing the mask in real time, and calling out the mask from the internal storage as required. In this instance, the procedure can transfer to the process at the later stage rapidly.

Next, the processes to be executed within the embedding position determining unit 0103 will be described below in detail.

[3-2-1 Mask Preparing Process]

To begin with, the mask preparing unit 1101 will be described below.

In embedding the appendant information Inf using the patchwork method, when a large operation is applied on the pixel values to strengthen the attack endurance to embed the information (e.g., when a large value of C for the pattern arrangement is set), the image degradation is less visible at what is called the edge section where there are rapid changes of the pixel values in the image represented by the original image data, but the portion where the pixel values are manipulated is remarkable noise in the flat area with less changes of the pixel values.

Figure 13:
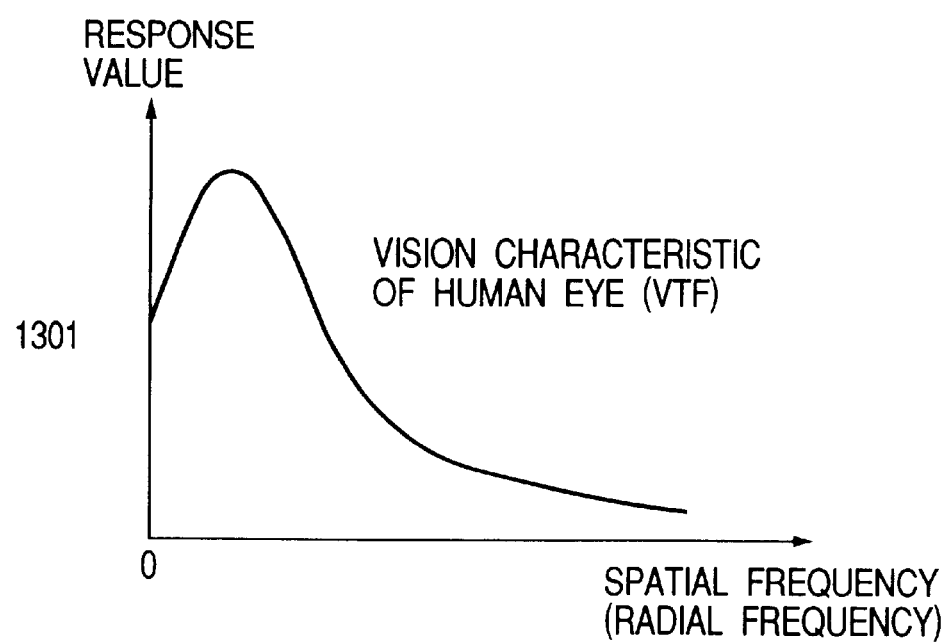
FIG. 13 is a graphic representation illustrating a spatial frequency characteristic for a vision of human eyes.

FIG. 13 shows the spatial frequency characteristic that is sensed by the human eyes. The axis of abscissas represents the spatial frequency (Radial Frequency), while the axis of ordinates represents the response value of vision. When the pixel values are operated to embed the information, the image degradation is conspicuous in the low frequency region where the human eyes are very sensible, as seen from FIG. 13.

Therefore, in the present embodiment, taking into consideration the characteristic of a blue noise mask or cone mask, which is normally used, for binarization of the multi-valued image, the pattern arrangement corresponding to each bit is made.

Next, the characteristic of the blue noise mask or cone mask will be briefly described below.

First, the characteristic of the blue noise mask will be explained.

The blue noise mask has the characteristic of producing a blue noise pattern even if the image is binarized at whatever threshold. This blue noise pattern is one having a frequency characteristic that the spatial frequency is biased in the high frequency region. FIG. 37 shows a part of the blue noise mask.

Figure 14:
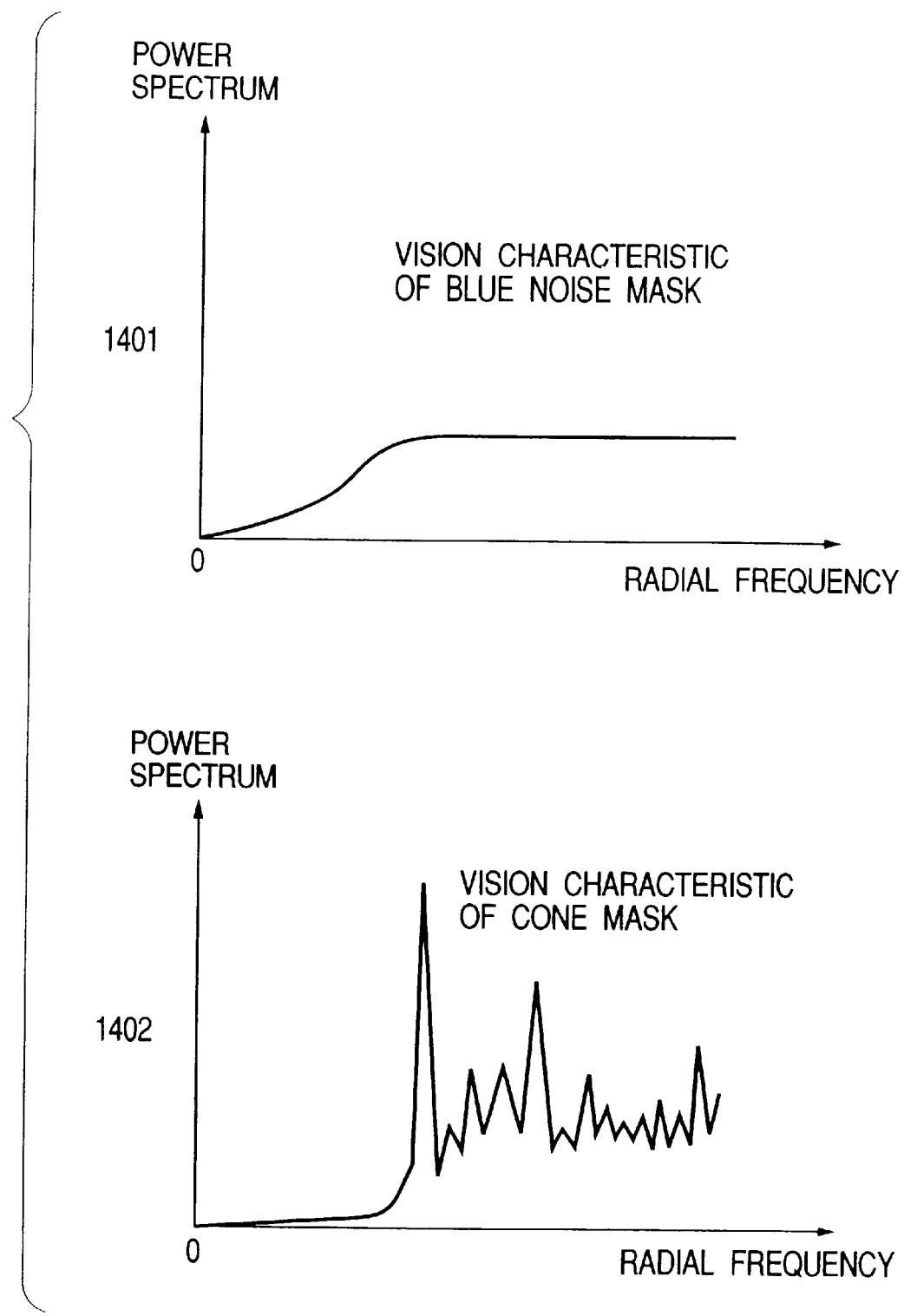
FIG. 14 is a graphic representation illustrating the spatial frequency characteristic of a blue noise mask and a cone mask.

FIG. 14 shows in 1401 schematically the spatial frequency characteristic of the blue noise mask binarized at a threshold of 10.

The axis of abscissas in 1401 is the Radial Frequency, indicating the distance from the origin (direct current component) when the blue noise mask is subjected to the Fourier transform. The axis of ordinates is the Power Spectrum, indicating the average value of the sum of squared amplitude components which reside within the distance indicated by the axis of abscissas or Radial Frequency. The same figure represents the two dimensional frequency characteristic of the image in one dimensional graph for easy understanding.

From a comparison with FIG. 13, it can be found that since the blue noise mask is biased in the high frequency component, it is less visible to the human eyes. Accordingly, in the ink jet printer, the blue noise mask is used to bias the spatial frequency component to the high frequency region and represent the area gradation without being visible to the human eyes, when representing the gradation of a multi-valued image at the area gradation of dots.

An example of a blue noise mask preparing process will be shown below.
1. Generate the white noise.
2. Low pass filter a binary image $P_{gl}$ (initially a white noise mask) at gradation g to create a multi-valued image $P'_{gl}$.
3. Compare an image at gradation g (initial value: 127) and a low pass filtering image $P'_{gl}$ (multi value), and invert white and black pixels of the binary image $P_g$ in the order of larger error to get a binary image $P_{gl+1}$.
4. Repeat the operations 2, 3 until the error is minimum and change gradually the binary image $P_{gl}$ (initially a white noise mask) to the binary image $P_g$ (blue noise mask) at gradation g (initial value: 127).
5. Apply to the Pg image binary black (white) points at gradation g+1 (g−1) at random positions and repeat the operations 2, 3 to get $P_{g+1}(P_{g-1})$ By repeating the above operations, the blue noise mask at all the gradations is prepared, and a dither matrix is created.

For example, in a blue noise mask of 32×32, four points increase (decrease) for each gradation.

However, since the black (white) bits determined at the previous gradation g can not be inverted to provide 256 gradations, there is the drawback that severe limitations are imposed at the low or high gradation, and the less uniform random pattern can be only obtained.

Figure 12:
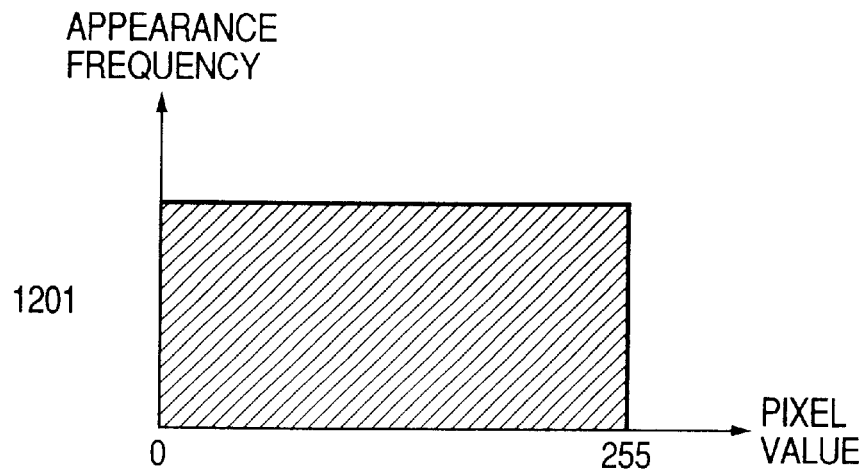
FIG. 12 is a graphic representation illustrating an appearance frequency distribution of coefficient values for a cone mask and a blue noise mask.

FIG. 12 shows an appearance frequency distribution (histogram) 1201 of the coefficient values making up the blue noise mask. In FIG. 12, all the values (coefficients) from 0 to 255 exist in equal number within the mask.

A technique that the blue noise mask is used for binarization of the multi-valued image is well known. For example, see Tehophano Mitsa, Kevin J. Parker, "Digital halftoning technique using a blue-noise mask" J. Opt. Soc. Am A, Vol. 9, No. 11, November 1992.

Next, the characteristic of the cone mask will be described below.

The cone mask has one feature that periodical or pseudo periodical peaks arise as shown in 1402 of FIG. 14, in the spatial frequency region representing the binary information obtained here when each coefficient contained in this mask is binarized. However, the cone mask is designed such that no peak takes place in the low frequency region.

FIG. 38 shows part of a coefficient arrangement of a certain cone mask.

In the case where the cone mask is binarized at whatever threshold, an adequate distance is kept between dots, and no peak takes place in the low frequency region.

FIG. 14 shows in 1402 schematically the spatial frequency characteristic when the cone mask is binarized at threshold 10. Like the spatial frequency characteristic of the blue noise mask in 1401, it can be found that there is less low frequency component in the characteristic of 1402.

In the case of the cone mask, since some peaks arise from the frequency higher than the low frequency for the blue noise mask, whether the threshold is high or low, there are fewer congested portions at the embedding position than the blue noise mask. Therefore, there is the advantage that the embedding noise caused in embedding the appendant information Inf is less remarkable than in the case of the blue noise mask.

The use frequency of the coefficients making up the cone mask has an appearance frequency distribution (histogram) as represented in 1201 of FIG. 12, like the blue noise mask.

Accordingly, if the pattern corresponding to each bit information making up the appendant information Inf is associated with the coefficients of this cone mask, and embedded in the image data, the pattern corresponding to each bit information can be embedded in equal number into this image data, so that the appendant information Inf can be embedded in good balance.

In this embodiment, from the above advantage, the cone mask is used for the embedding reference mask.

[3-2-2 Mask Reference Unit]

A mask (cone mask) prepared by the mask preparing unit 1101 is input into the mask reference unit 1102.

The mask reference unit 1102 determines the embedding position by associating the embedding position of N-bit information to embed the image with the mask number (pixel value).

An embedding position determining method for the mask reference unit 1102 will be described below.

Figure 15:
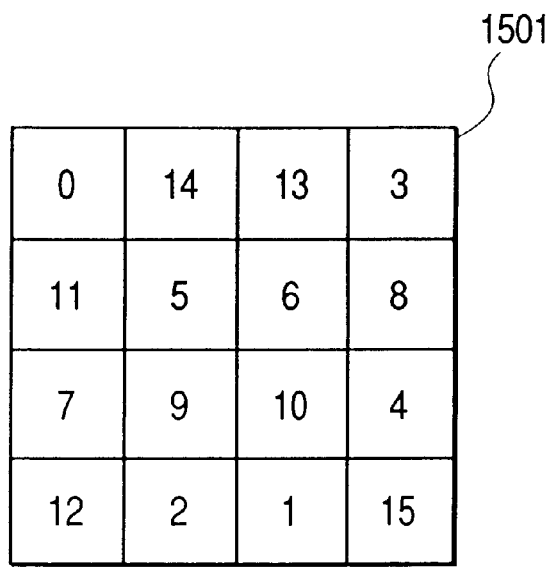
FIG. 15 is an explanatory diagram for explaining a position reference mask.
Figure 16:
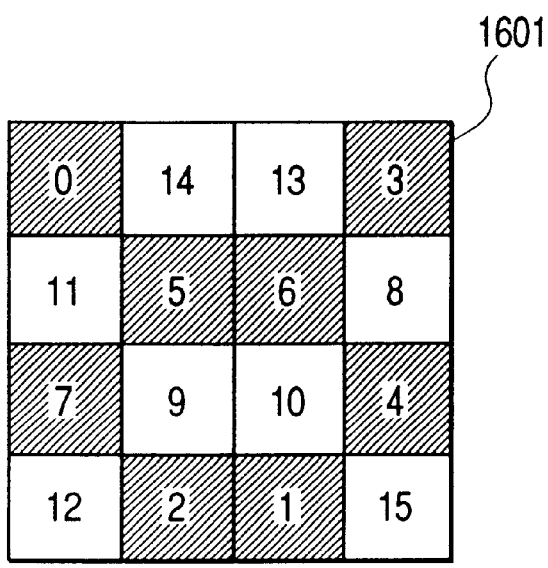
FIG. 16 is a conceptual diagram showing the embedding position within the position reference mask.

In this embodiment, the cone mask is used, but for easy understanding, a 4×4 mask indicated at 1501 in FIG. 15 is used.

The mask of FIG. 15 has 4×4 coefficients, in which the coefficient values from 0 to 15 are arranged one for one. Using this 4×4 mask, the embedding position of the appendant information Inf is referenced. In the case of the cone mask for use, the appendant information Inf consisting of 16 bits at maximum can be embedded, but an instance where the appendant information Inf of 8 bits is embedded will be described below.

Referring first to FIG. 36, the configuration of the appendant information Inf will be described below. As shown in the same figure, the appendant information Inf consists of the start bit $Inf_1$ and the utilization information $Inf_2$.

This start bit $Inf_1$ is used in an offset adjustment unit contained in the digital watermark extracting apparatus to recognize that the actual position of embedding the appendant information Inf is dislocated from the ideal position, and correct the extracting start position of the digital watermark (appendant information Inf) for this dislocation. The start bit $Inf_1$ will be described later in detail.

The utilization information $Inf_2$ is used as the intrinsic appendant information, namely, the appendant information of the image data I. This utilization information includes an apparatus ID and a user ID, as shown in FIG. 1, in the case where it is aimed to keep track of a cause in the invalid use of the image data wI. Also, in the case where it is aimed to inhibit copying the printed matter of the image data wI, the control information is included indicating that copying is inhibited.

In this embodiment, the start bit consists of 5 bits, and uses a bit sequence of "11111". However, the present invention is not limited to this bit sequence, but the bits other than five bits among the appendant information Inf can be used as the start bit, or a bit sequence other than the bit sequence "11111" can be employed as the start bit. Note that it is necessary that the number of bits and the bit sequence for the start bit are commonly used between the digital watermark embedding apparatus and the digital watermark extracting apparatus.

A simple example of embedding the appendant information Inf of a total of 8 bits comprised of 5 bits for the start bit and 3 bits for the utilization information, using a cone mask consisting of 4×4 coefficients as above, will be described below.

However, the present invention is not limited to such example, but can be applied to an instance where for example, using a cone mask of 32×32, the appendant information Inf of a total of 69 bits comprised of the start bit of 5 bits and the utilization information of 64 bits is embedded.

Suppose that the appendant information Inf comprises the start bit of 5 bits "11111" and the utilization bit of 3 bits "010". Then the bit information includes 1 at the first position, 1 at the second position, 1 at the third position, 1 at the fourth position, 1 at the fifth position, 0 at the sixth position, 1 at the seventh position, and 0 at the eighth position.

Each of the patterns (see FIG. 9) corresponding to each of those bits is assigned to a position corresponding to each of the coefficients of the cone mask, and each pixel value of the original image data is incremented or decremented by c in this positional relation. Thereby, one appendant information Inf is embedded into the original image data of the size corresponding to one cone mask.

In this embodiment, a threshold is determined, based on the minimum number of bits required to embed the appendant information Inf, and each corresponding bit information is embedded into each position where the coefficients equal to or less than this threshold are arranged. Thereby, one appendant information Inf is embedded into one cone mask, irrespective of the number of bits for the appendant information Inf.

The present invention is not limited to the above method, but may be implemented in such a way that each corresponding bit information is embedded into each position where the coefficients equal to or greater than a certain threshold are arranged, and the threshold is determined under this condition.

In this embodiment, the proportion at which the number of coefficients equal to or less than the threshold for use in embedding is occupied in the number of coefficients for the entire mask is referred to as an embedding fill-up rate.

To embed the appendant information Inf of 8 bits correctly integral times, it is necessary that a threshold for determining which coefficient is used for the embedding reference position in the mask 1501 of FIG. 15 is 8 or 16. This threshold is selected to be an optimal value in consideration of the endurance and the influence on the picture quality.

Herein, in the case where the threshold for the mask is 8, the embedding fill-up rate is 50%. That is, 50% of the original image data to be compared with the above mask is processed using a pattern arrangement of FIG. 9.

One example of the associated relation between each bit information and the coefficient within the mask is listed in a correspondence table 1.

<Correspondence Table 1>

|  | Order of embedding bit information | | | | | | | |
| --- | --- | --- | --- | --- | --- | --- | --- | --- |
|  | S1 | S2 | S3 | S4 | S5 | 1 | 2 | 3 |
| Coefficient within mask | 0 | 1 | 2 | 3 | 4 | 5 | 6 | 7 |

Herein, S1 to S5 are bit information (start bit) for alignment for use in the offset adjustment unit. 1 to 3 are the utilization information of three bits.

In accordance with the relation of the correspondence table 1, each bit information is embedded into each pixel position of the input image data corresponding to each of the positions of coefficients (0 to 7) represented at 1601 of FIG.

16, using a pattern (see FIG. 9). The associated relation between the order of embedding bit information and the coefficient value within the mask is a part of key information, and it is not impossible to extract each bit information without knowing this associated relation. In this embodiment, for the convenience of simpler explanation, S1 to S5 and 3 bits of utilization information are associated in succession with the coefficient values from 0 to the threshold as in the correspondence table 1.

Next, the fill-up rate of embedding when using a cone mask of the size of 32×32 will be briefly discussed below. A procedure of this process is the same as when using the mask 1501.

To begin with, taking into consideration the image degradation caused by embedding, a threshold required to embed the appendant information Inf integral times correctly is determined.

The number of coefficients equal to or less than the threshold is divided by the number of bits N making up the appendant information Inf, so that each bit making up the appendant information Inf is embedded the equal number of repetitions, and how many times each bit can be embedded with one mask size is determined.

For example, when the appendant information Inf of a total of 69 bits comprised of the start bit of 5 bits and the utilization information of 64 bits in the above one example is embedded into the original image data corresponding to the coefficient values from 0 to 255, the threshold is set to 137.

In this case, the number of effective coefficient values within the mask is 138. Since the number of bits required to represent one appendant information Inf is 69, each bit information can be embedded twice (i.e., 138/69=2) in one mask size.

When the embedding position using the cone mask is determined, the reason of embedding into all the points having the coefficient values equal to or less than a certain threshold is to exhibit the characteristic of the cone mask that no peak takes place in the low frequency components of the spatial frequency.

As a result of determining the embedding position as described above, the relation between each bit information making up the appendant information Inf and each coefficient value making up the cone mask is as shown in a correspondence table 2, in the case where the embedding fill-up rate is 50% and the embedding information amount is 69 bits.

<Correspondence Table 2>

In the case where a cone mask of 32×32 is used, four positions having the same coefficient exist within one mask.

In the case where each bit information is embedded into all the coefficients of the original image data based on the above correspondence table 2, each bit information making up the appendant information Inf is embedded substantially the same number of times, if the cone mask is as large as 32×32, 64×64, etc. also, the same bit information is diffusely embedded in the original image data.

In the patchwork method, conventionally, the embedding positions were selected randomly so that the patterns (see FIG. 9) corresponding to each bit information do not overlap each other. In this embodiment, however, there is the same effect by referring to the above cone mask, with less image gradation.

As a result, the mask reference unit 1102 gets the coordinates (x,y) at the embedding position corresponding to each bit information.

Representing the information with an array S[bit][num]= (x,y), bit represents the start bits S1 to S5 and the utilization bits 1 to 3 in the correspondence table 1. num is the order numbered to each coefficient arising repetitively within the cone mask. (x,y) contains the relative coordinates within the mask. The above operation is performed by the mask reference unit 1102.

[3-2-3 Mask Pattern Arrangement Correspondence Unit]

The embedding position of each bit information within the cone mask that is obtained by the mask reference unit 1102 is input into a mask pattern arrangement correspondence unit 1103.

Since the embedding position determined by the mask reference unit 1102 is the position of the pattern (for 8×8 pixels) for each bit information, it is further necessary to assign an addition region (+c), a subtraction region (−c) and other regions (0), as shown in FIG. 9, in the patchwork method. To this end, the mask pattern arrangement correspondence unit 1103 performs an operation of developing a pattern arrangement of 8×8 size corresponding to FIG. 9 at all the positions of the cone mask referred to by the mask reference unit 1102.

Specifically, for the coordinates of an array S[bit][num]= (x,y) obtained by the mask reference unit 1102, the x coordinate is multiplied by the size of the pattern arrangement in the horizontal direction, and the y coordinate is multiplied by the size of the pattern arrangement in the longitudinal direction. Consequently, a coordinate 1701 within the mask of FIG. 17 is a top coordinate 1702 in which one pixel within the mask is enlarged to one pattern arrangement.

|  | Order of embedding bit information | | | | | | | | |
|---|---|---|---|---|---|---|---|---|---|
|  | S1 | S2 | S3 | S4 | S5 | 1 | 2 | ... | 64 |
| Coefficient within the cone mask | 0, 1 | 2, 3 | 4, 5 | 6, 7 | 8, 9 | 10, 11 | 12, 13 | ... | 136, 137 |

Herein, S1 to S5 are the start bits, or the bit information for alignment for use in the offset adjustment unit. 1 to 64 are the utilization information.

The present invention is not limited to this associated relation, but another correspondence relation between each bit information and each coefficient value may be employed, if each bit information is embedded, using the pattern of FIG. 9, in succession into all the positions of coefficients from 0 to the threshold (or from the threshold to 255).

Using the pattern arrangement as shown in FIG. 9 starting from this top coordinate, it is possible to embed without overlapping a region 1703 as large as the pattern arrangement.

The coordinates (x,y) are changed to the coordinates (x',y'), but bit and num in the array S[bit][num] are not changed.

Accordingly, supposing that for the appendant information Inf corresponding to bit of the array S[bit][num], the coordinates (x',y') are at the top position for embedding the pattern arrangement, multiple bit information can be embedded.

A large mask in which each coefficient of the cone mask is developed (expanded) into the pattern arrangement of 8×8 by the mask pattern arrangement correspondence unit 1103 is referred to as an expanded mask.

The size of the expanded mask is equal to (32×8)×(32×8), and this size is a minimum unit of pixels (macro block) necessary to embed at least one appendant information Inf.

The above operation is performed by the mask pattern arrangement correspondence unit 1103.

Generally, a small mask has less degree of freedom in the position of arranging the dots than a large mask, in creating the mask, and the creation of the mask having a desired characteristic like a cone mask is difficult. For example, in the case where the appendant information Inf is embedded by allocating a small mask all over the image data repetitively, the spatial frequency which the small mask has appears all over the image data.

On the other hand, since the appendant information Inf is extracted from one mask in the complete form, the cutting endurance (possibility of extracting the appendant information Inf from the partial image data wI') is reduced by setting the size of the mask to be larger. Hence, in view of the balance of the cutting endurance and image degradation, it is necessary to determine the size of the mask.

The above operation is performed by the embedding position determining unit 0103 of FIG. 1.

[3-3 Appendant Information Embedding Process]

The appendant information embedding unit 0104 of FIG. 1 actually embeds the appendant information Inf with reference to the embedding position of each bit information into the image data, determined in the above way.

Figure 10:
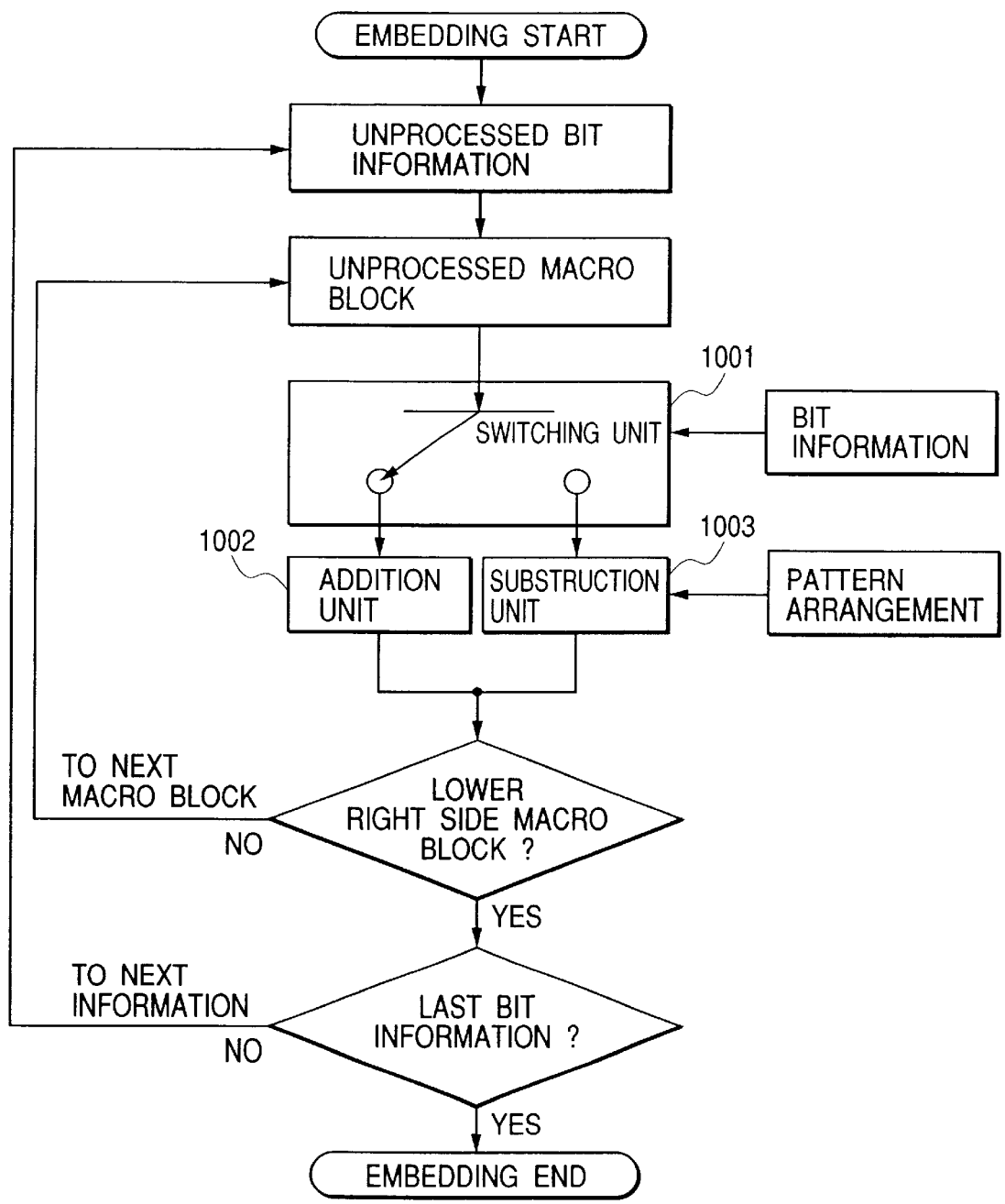
FIG. 10 is a flowchart showing the operation of an appendant information embedding unit.

FIG. 10 shows a flowchart of the operation of embedding the appendant information Inf repeatedly.

A method of FIG. 10 includes allocating a plurality of macro blocks which can be allocated to the entire image, and for all the macro blocks, embedding the first bit information repeatedly, embedding the second bit information repeatedly, embedding the third bit information repeatedly, and so on repeatedly. If there is any bit information that has not been yet embedded, this method includes a procedure of performing the embedding processes from 1001 to 1003 for all the macro blocks unprocessed.

However, the present invention is not limited to the above processing order, but may be effective even if the two nested loops are inverted in the inside and outside relation. That is, the above procedure may be altered to a procedure of embedding all the bit information that have not yet been embedded into the macro blocks unprocessed, if any.

Specifically, embedding the appendant information Inf includes adding a pattern arrangement of FIG. 9, in the case where each bit information to be embedded is "1". Or in the case where the embedding bit is "0", it includes subtracting the pattern arrangement of FIG. 9, or adding the pattern arrangement of FIG. 9 with the sign inverted.

This addition and subtraction process is implemented by switching a switching unit 1001 of FIG. 10 in accordance with the embedding bit information. That is, the switching unit switches the connection over to an addition unit 1002, when the embedding bit information is "1", or the switching unit switches the connection over to a subtraction unit 1003, when the embedding bit information is "0". This process at steps 1001 to 1003 is performed with reference to the bit information and the information of pattern arrangement.

Figure 19:
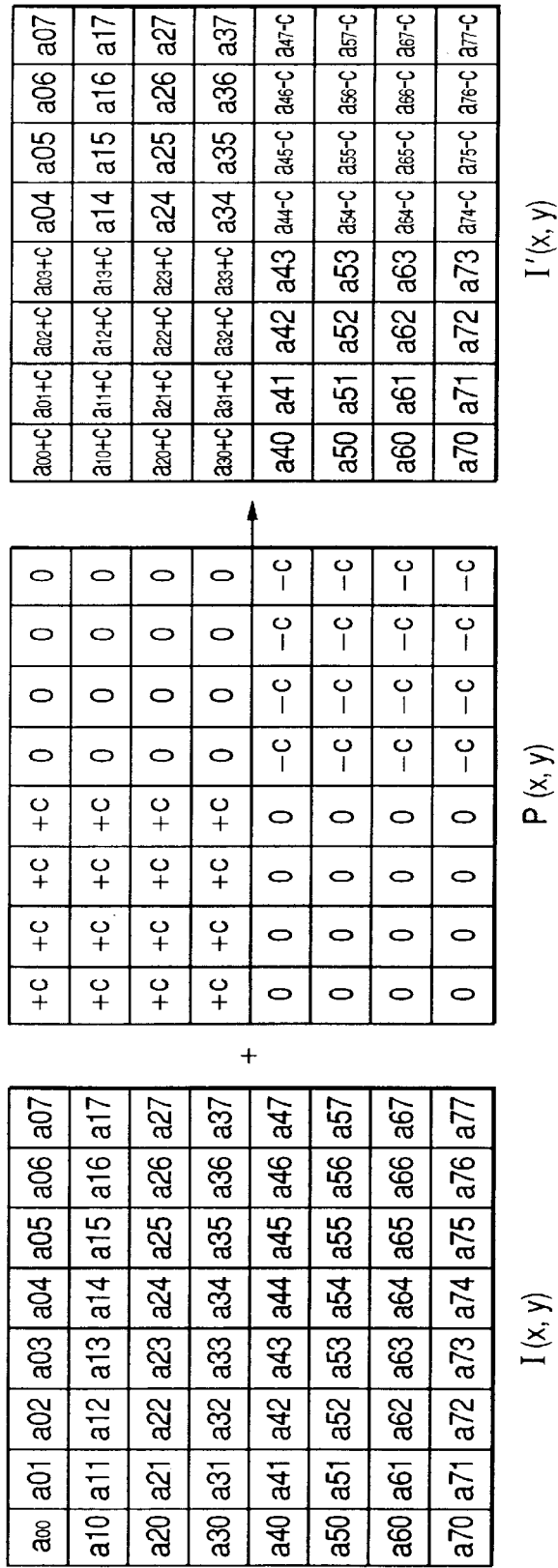
FIG. 19 is an explanatory diagram for explaining an arithmetic operation of embedding appendant information Inf.

Herein, FIG. 19 shows how one bit information is embedded. In the same figure, there is an example in which the embedding bit information is "1", namely, the pattern arrangement is added.

In the example of FIG. 19, I(x,y) is an original image, and P(x,y) is a pattern arrangement of 8×8. Each of the coefficients making up the pattern arrangement of 8×8 is superposed on the original image data (blue component) of the same size as this pattern arrangement, in which the values at the same position are added or subtracted. Consequently, I'(x,y) is calculated, and output to the color component synthesizing unit 0105 of FIG. 1 as the bit information embedded image data of blue component.

The above addition and subtraction process using the pattern arrangement of 8×8 is performed for all the embedding positions (positions at which the pattern arrangement for embedding each bit information is allocated) determined in the correspondence table 2 repeatedly.

Figure 18:
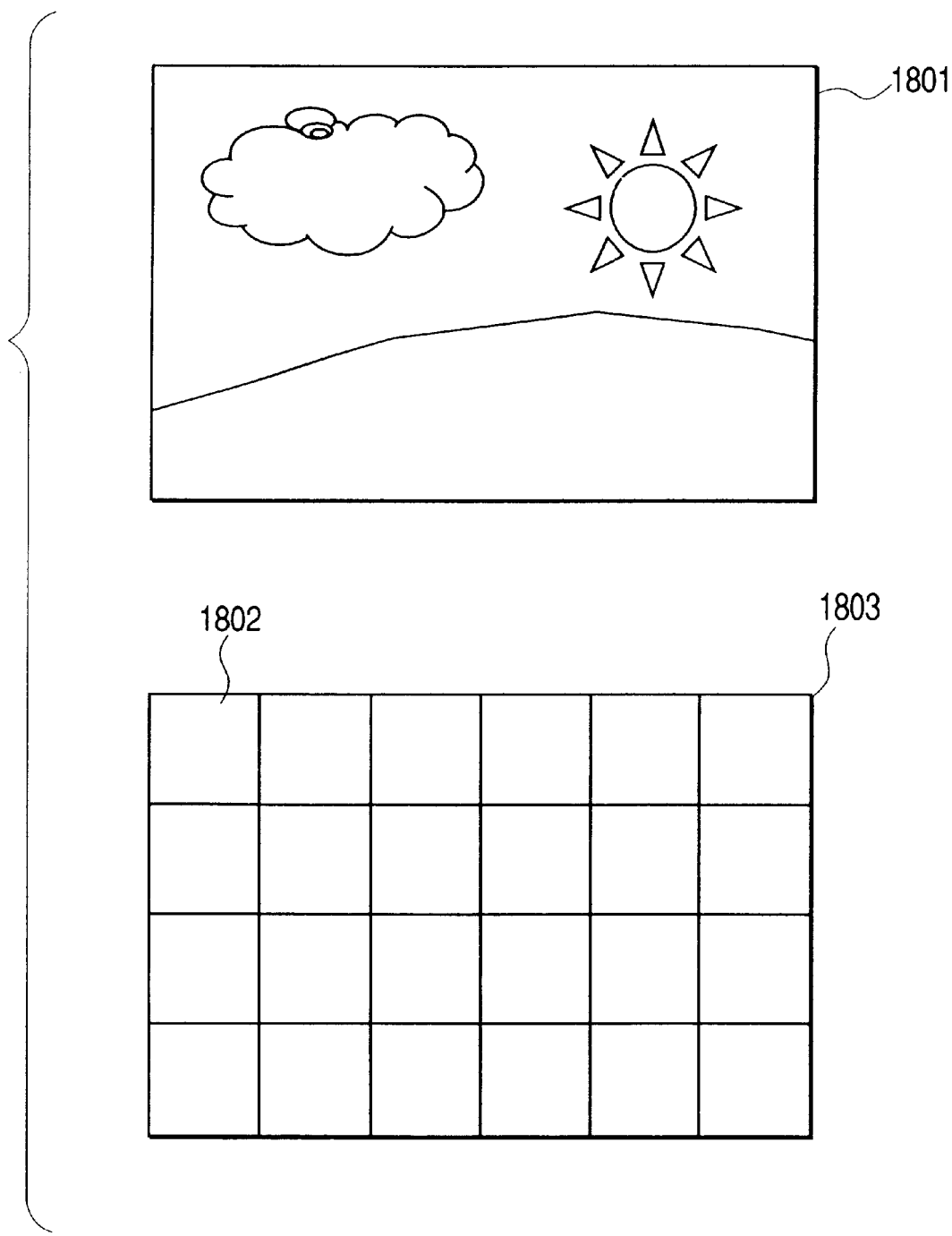
FIG. 18 is a view illustrating an area necessary for embedding the appendant information Inf in an overall image.

Next, FIG. 18 shows how an inside loop process of FIG. 10 is performed.

In FIG. 18, to embed each bit information repeatedly, a macro block 1802 is allocated to the entire image data 1801 (or 1803) from the left top to the right bottom in raster order, and embedded (steps 1001 to 1003 in FIG. 10).

The above operation is performed by the appendant information embedding unit 0104 so that the appendant information Inf is embedded into the whole image.

Through the above process, the appendant information Inf is embedded into the image data. If each of the pixels of the image data having the appendant information Inf embedded is represented with a sufficiently small number of dots, the size of the pattern arrangement is sufficiently small, such that each of these pattern arrangements is not sensible to the human eyes only as a very small point. Therefore, the spatial frequency characteristic of the cone mask can be maintained and is less visible to the human eyes.

[3-4 Registration Process]

The registration unit 0202 of FIG. 2 provided in the digital watermark extracting apparatus will be described below in detail.

The registration unit 0202 is located at a stage prior to the appendant information extracting unit 0203, and a preprocess for the appendant information Inf extracting process. The image data of blue component extracted by the color component extracting unit 0201 at the previous stage is input into the registration unit 0202.

The registration unit 0202 corrects a scale difference between the image data wI output from the digital watermark embedding apparatus and the image data wI' input into the digital watermark extracting apparatus.

FIG. 7 shows the registration unit 0202 in detail. As shown in FIG. 7, the registration unit 0202 comprises a block dividing unit 0701, a Fourier transforming unit 0702, an impulse extracting unit 0703, a scaling ratio calculation unit 0704, and a scaling unit 0705.

The block dividing unit 0701 performs the same block dividing process as the registration signal embedding unit 0102 (block dividing unit 0401). Through this block dividing process, it is generally difficult to extract the same blocks as the registration signal embedding unit 0102 (block dividing unit 0401). This is due to the fact that the image data wI having the digital watermark information embedded is subjected to the printing process, so that the size of the image data is changed and the image data is dislocated.

However, the extraction of the blocks may be more or less falsely performed, but there is no problem. This is because in the digital watermark embedding apparatus, the registration signal is embedded into the amplitude spectrum of the image data. The amplitude spectrum has the nature that it is not affected by the dislocation in the spatial region of the image data. Hence, in each of the digital watermark embedding apparatus and the digital watermark extracting apparatus, there is no problem that the blocks divided by each block dividing unit may be more or less dislocated in the spatial region.

The block dividing unit 0701 outputs the divided blocks of the image data to the Fourier transforming unit 0702. The Fourier transforming unit 0702 transforms the image data in the spatial region into the image data in the frequency region, like the registration signal embedding unit 0102. The Fourier transformed image data in the frequency region is represented by the amplitude spectrum and the phase spectrum. Among them, the amplitude spectrum is only input into the impulse extracting unit 0703. On one hand, the phase spectrum is aborted.

The image data of the frequency region is input into the impulse extracting unit 0703. The impulse extracting unit 0703 extracts only the signal of impulse nature from the image data transformed into the frequency region. That is, the signals 0502, 0503, 0504, and 0505 already embedded into the image data as shown in FIG. 5 are extracted.

This operation can be effected using a well-known image processing technique. For example, it is possible to threshold the image data transformed into the frequency region. This example is shown in FIG. 8A. FIG. 8A shows how to threshold the amplitude spectrum 0801 input into the impulse extracting unit 0703 at a threshold value 0802. As a matter of convenience, the image data transformed in FIGS. 8A and 8B is represented in one dimension. By selecting an adequate threshold value 0802, the impulse signal can be extracted. However, the intrinsic image data having an amplitude substantially as large as the impulse signal in the low frequency region is extracted at the same time.

A method for solving this problem in this embodiment is shown in FIG. 8B. The image data 0801 transformed into the frequency region is subjected to a two dimensional differentiation process. This process is equivalent to a Laplacian filter. The image data 0801 transformed into the frequency region that has been two dimensionally differentiated is shown at 0803. By selecting an adequate threshold value 0804 for the data 0803, and thresholding the data 0803 at the threshold value 0804, the impulse signal can be extracted.

The principle of extracting this impulse signal will be described below in more detail using FIG. 26. In this figure, a process on the registration signal embedding side is also shown.

In the registration signal embedding unit 0102, the image data 2601 in the spatial region is transformed into the image data 2602 in the frequency region, and an impulse signal 2603 is added to the image data 2602 in the frequency region.

The image data in the frequency region to which the impulse signal (registration signal) 2603 is added is subjected to inverse frequency transform and restored to a signal 2601' in the spatial region. The image data 2601' in the spatial region may have some influence by the addition of the impulse signal, which is invisible to the human eyes. The image data 2601 and the image data 2601' are seen to be substantially equal. This is because the impulse signal 2603 applied in the frequency region is distributed over the entire image data at minute amplitude owing to the inverse Fourier transform.

Figure 26:
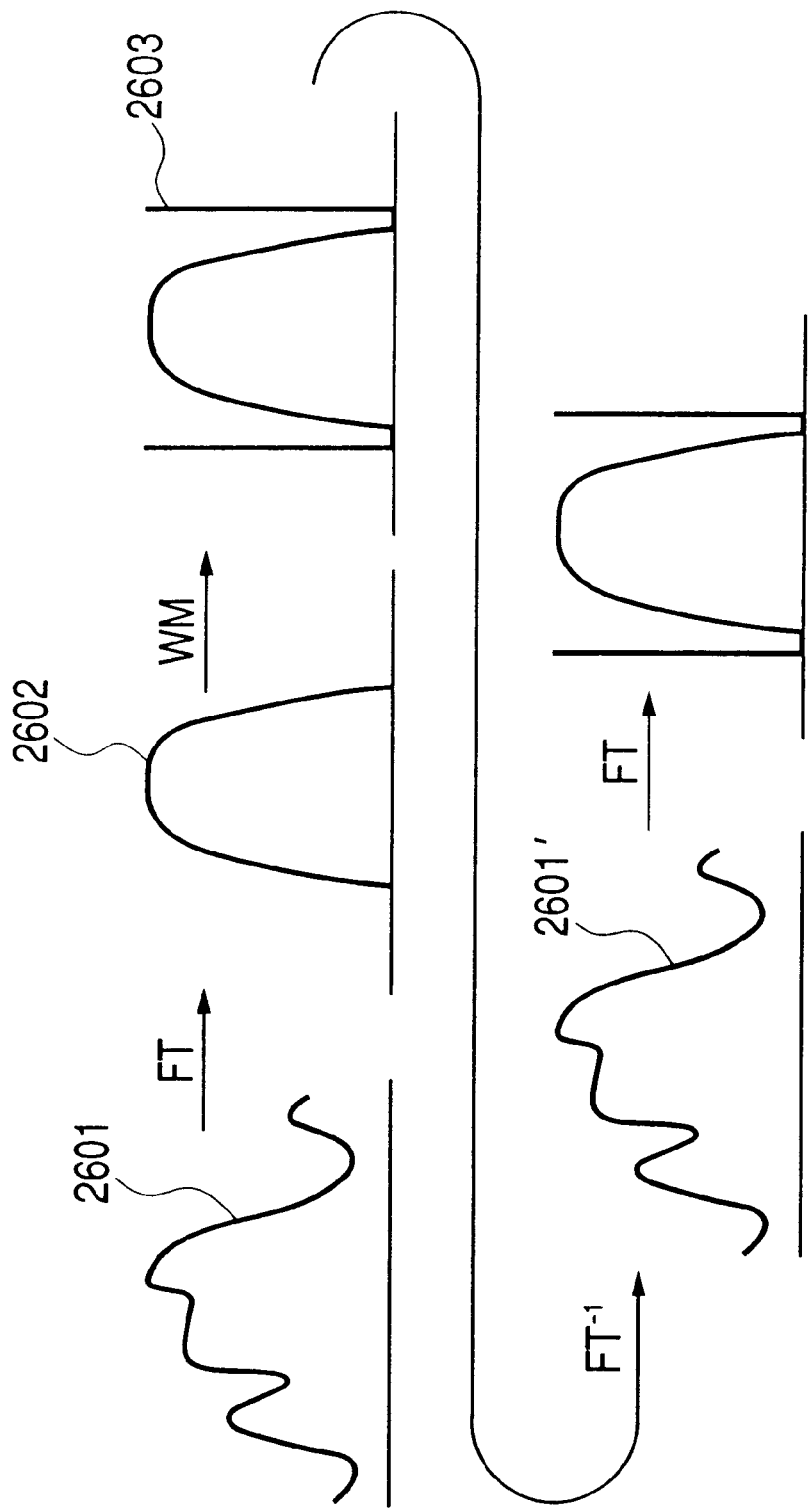
FIG. 26 is a graphic representation illustrating the principle of embedding and extracting a registration signal.

In the case where the impulse signal as indicated at 2603 in FIG. 26 is applied, it is equivalently stated that the image data having a certain frequency component is applied to the spatial region. This applied impulse signal has a frequency larger than the frequency sensible to the human eyes, and an amplitude below the limit value at which the human is sensible, the applied impulse signal is invisible to the human eyes. Therefore, embedding the registration signal can be said to be a kind of the digital watermark process.

In this embodiment, after the registration signal 2603 has been embedded into the image data 2601, and the appendant information Inf to be embedded in practice has been embedded, the signal 2601' in the spatial region is restored.

The registration signal embedded as shown in FIG. 26 is subjected to the Fourier transform again in extracting. Thereby, the registration signal 2603 once diffused over the entire image data in the spatial region is transformed into the frequency region, and appears as the impulse signal again.

In the case where the digital watermark embedded image is subjected to some attack such as a JPEG compression or non-reversible compression, there is the high possibility that this impulse is smaller in amplitude. On one hand, when subjected to a geometrical attack such as scaling, this impulse shifts. In either case, the impulse signal can be extracted by applying an adequate impulse extracting process as described above, and the variations from the original image data can be estimated. By correcting the variations, the appendant information Inf embedded in this embodiment can be surely embedded.

Through the above process, the impulse signal is output from an impulse extracting unit 0703 of FIG. 7, and input into a scaling ratio calculation unit 0704. The scaling ratio calculation unit 0704 calculates the scaling ratio using the coordinates of the input impulse signal.

In the digital watermark extracting apparatus of this embodiment, it is supposed that the frequency component into which the impulse signal has been embedded is known. In this case, the scaling ratio can be calculated based on a ratio of embedded frequency to impulse detected frequency. For example, assuming that the frequency at which the impulse signal is embedded is a, and the frequency at which the frequency of detected impulse signal is b, the scaling ratio is equal to a/b. this is a property of the well-known Fourier transform. Through the above process, the scaling ratio is output from the scaling ratio calculation unit 0704.

However, the present invention is not limited thereto, but may be configured in such a way that the information concerning the position (frequency) at which the registration signal is embedded as required is received from the digital watermark embedding apparatus. For example, the present invention includes the configuration where this positional information is received as an encryption signal, and the scaling ratio is calculated. Thereby, it is only the person who knows the registration signal that the appendant information Inf can be extracted correctly. In this case, the registration signal can be used as a key for extracting the appendant information Inf.

The scaling ratio output from the scaling ratio calculation unit 0704 is input into the scaling unit 0705. The image data $wI_1'$ is also input into the scaling unit 0705, and the image data $wI_1'$ is passed through the scaling process at the input scaling ratio. The scaling process may include bilinear interpolation or bicubic interpolation, and others. And the image data $wI_2'$ which has been passed through the scaling process is output from the scaling unit 0705.

[3-5 Appendant Information Extracting Process]

The operation of the appendant information extracting unit 0203 of FIG. 2 which extracts the appendant information Inf from the blue component of the image data wI' having the appendant information Inf embedded by the appendant information embedding unit 0104 of FIG. 1 will be described below.

FIG. 20 is a block diagram of an extracting process of this appendant information Inf.

[3-5-1 Embedding Position Determining Process]

As shown in FIG. 20, firstly, an embedding position determining unit 2001 determines from which area of the image data wI$_2$' (blue component) the appendant information Inf should be extracted. The operation of this embedding position determining unit 2001 is the same as that of the embedding position determining unit 0103 as previously described, so that the areas determined by the embedding position determining units 0103 and 2001 are the same.

Using the correspondence table 2 as previously described and the pattern arrangement as shown in FIG. 9, the appendant information Inf is extracted from the determined area.

Herein, the extraction of the appendant information Inf is implemented by convoluting the pattern arrangement in the determined area.

[3-5-2 Reliability Distance Calculation Unit]

The reliability distance d is a calculated value necessary to extract the embedded information.

Figure 6:
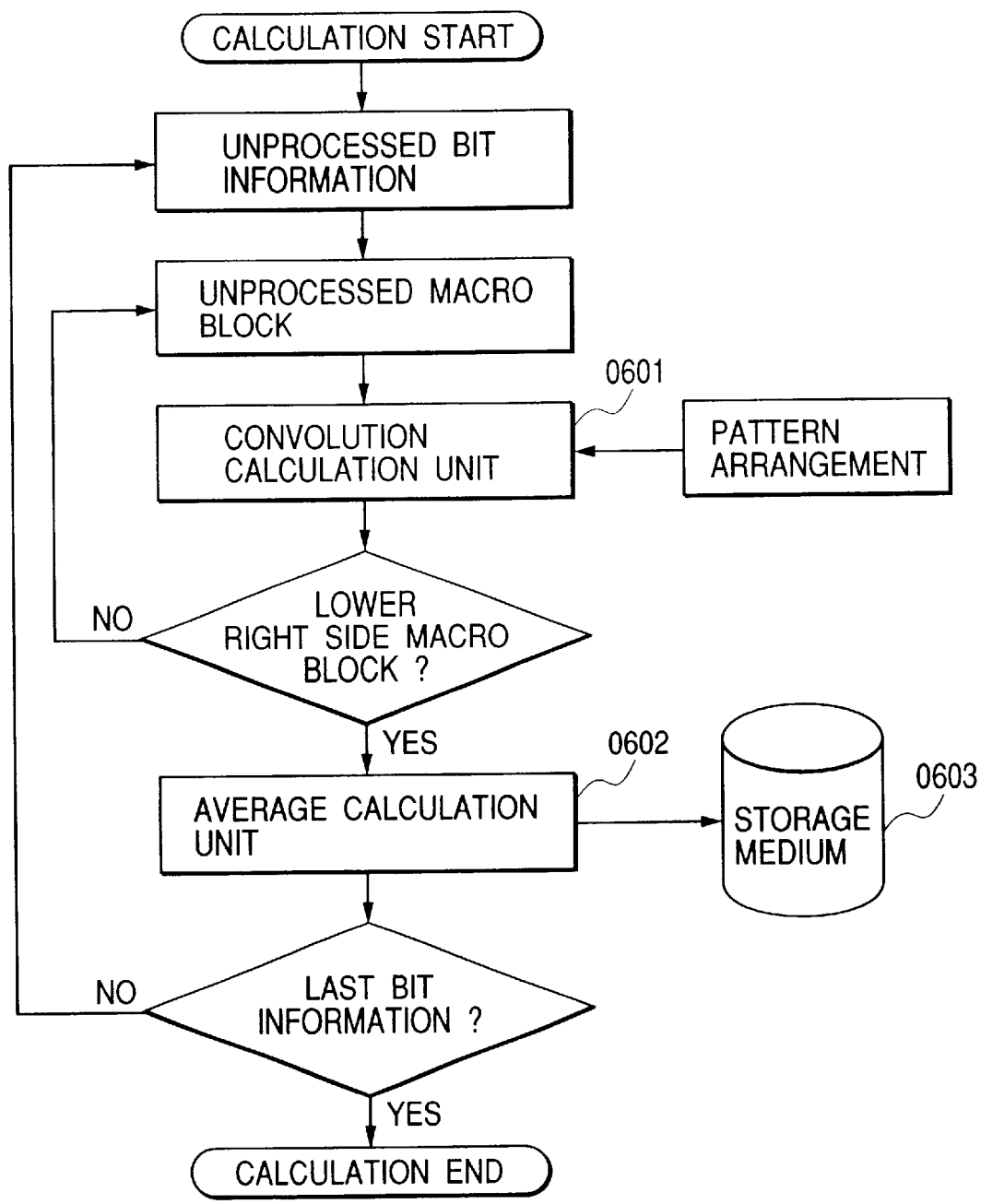
FIG. 6 is a flowchart showing an operation of a reliability distance calculation unit.

A method of calculating the reliability distance d corresponding to each bit information is shown in FIG. 6.

To begin with, a process of a convolution calculation unit 0601 in the figure will be described below with reference to FIGS. 21 and 22.

FIGS. 21 and 22 illustrate the examples of extracting one bit information making up the appendant information Inf.

More particularly, FIG. 21 illustrates an example in which a one bit information extracting process has been performed for the image data (blue component) I"(x,y) into which one bit information making up the appendant information Inf has been embedded, and FIG. 22 illustrates an example in which a one bit information extracting process is to be performed for the image data I(x,y) into which one bit information making up the appendant information Inf has not been embedded.

In FIG. 21, I"(x,y) is the image data having one bit information embedded, and P(x,y) is an 8×8 pattern arrangement (pattern arrangement for extracting the appendant information Inf) for use in the convolution process. Each element (0,±c) making up this 8×8 pattern arrangement is integrated on the pixel value arranged at the same position of the input image data I"(x,y), and the sum of the integrated values is calculated. That is, P(x,y) is convoluted on I"(x,y). Herein, I"(x,y) is a representation including the image in the case where the image data I'(x,y) is subjected to an attack. In the case where the image data I'(x,y) is subjected to no attack, I"(x,y) is equal to I'(x,y). In the case where the image has one bit information embedded, there is the high possibility that the non-zero values are obtained as a result of convolution, as shown in FIG. 21. In particular, when I"(x,y) is equal to I'(x,y), the result of convolution is 32c$^2$.

In this embodiment, the pattern arrangement for use in embedding and the pattern arrangement for use in extraction are the same. However, the present invention is not limited to such a case. Generally, assuming that the pattern arrangement for use in embedding is P(x,y) and the pattern arrangement for use in extraction is P'(x,y), the relation of P'(x,y)=aP(x,y) can be concluded, where a is arbitrary real number. In this embodiment, a=1 is assumed for simplicity.

On the other hand, in the example of FIG. 22, the same arithmetic operation as above is applied on the image data I(x,y) having one information not embedded. As a result of convolution, the zero value is obtained from the original image data (corresponding to the image data I), as shown in FIG. 22.

The extracting method of one bit information has been described above using FIGS. 21 and 22. However, in the above case, the result of convolution calculation in the image data I into which the appendant information Inf is to be embedded is zero, which is a very ideal case. On the other hand, in an area of the actual image data I corresponding to the 8×8 pattern arrangement, the result of convolution calculation is seldom zero.

That is, when the convolution calculation is performed using a pattern arrangement of FIG. 9 (the cone mask is referenced as the arrangement information) in the area of the original image data (image data I) corresponding to the 8×8 pattern arrangement, the non-zero value may be calculated unidealistically. Conversely, in an area of the image data (image data wI) having the appendant information Inf embedded corresponding to the 8×8 pattern arrangement, the result of convolution calculation may be not "32c$^2$" but "0".

However, each bit information making up the appendant information Inf is embedded into the original image data multiple times. That is, the appendant information Inf is embedded into the image many times. Accordingly, in n macro blocks where each bit information has been embedded, the convolution calculation is made for each 8×8 pattern arrangement, and it may be statistically judged whether or not each bit information has been embedded, or whether each bit information is 1 or 0, based on the n results of convolution calculation for each bit information. A method of statistical judgement as above will be described later.

Hence, the convolution calculation unit 0601 calculates the sum of a plurality of convolution calculation results for each bit information making up the appendant information Inf. For example, if the appendant information Inf consists of 8 bits, eight sums can be obtained. The sum corresponding to each bit information is input into an average calculation unit 0602, where the sum is divided by the total number of macro blocks n and averaged. This average value is a reliability distance d. That is, this reliability distance d is a value of deciding by majority which the result of convolution calculation is closer to "32c$^2$" or "0" of FIG. 21.

However, since the reliability distance d is defined as d=1/NΣ(a$_i$−b$_i$) in the previous description of the patchwork method, more strictly, the reliability distance d is an average value of the results of convolution calculation using P'(x, y)=1/cP(x,y). However, even if the convolution calculation is performed using P'(x,y)=aP(x,y), the average value of convolution calculation results is a real number multiple of the reliability distance d, and the same effects can be essentially obtained. Hence, in the present invention, it is sufficiently possible to use the average value of convolution calculation results using P'(x,y)=aP(x,y) as the reliability distance d.

The reliability distance d obtained is stored in the storage medium 0603.

The convolution calculation unit 0601 calculates the reliability distance d repeatedly for each bit information making up the appendant information Inf, and stores it in the storage medium 0603 successively.

This calculated value will be discussed below in more detail. The reliability distance d calculated for the original image data I using a pattern arrangement (the cone mask is also referenced as the arrangement information) of FIG. 9 is ideally zero. However, in the actual image data I, this value is very approximately zero, but non-zero mostly. A frequency distribution of the reliability distance d for each bit information is shown in FIG. 23.

Figure 23:
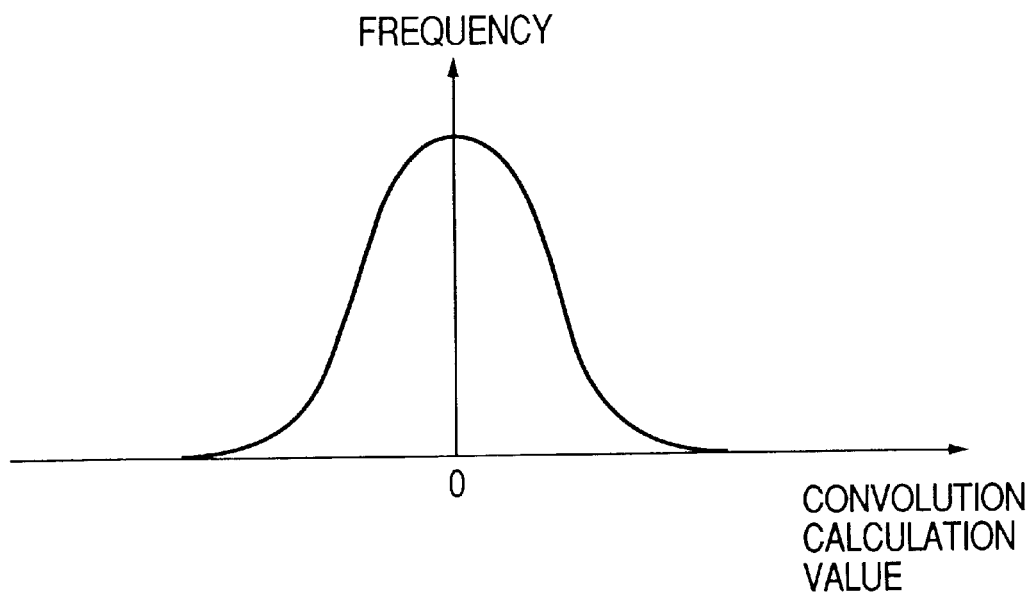
FIG. 23 is a graphic representation illustrating an ideal appearance frequency distribution when a reliability distance d is extracted from an original image.

In FIG. 23, the axis of abscissas represents the value of the reliability distance d for each bit information, while the axis of ordinates represents the number of bit information (appearance frequency of the reliability distance d) that is convoluted to produce the reliability distance d. As seen from the figure, this graph of appearance frequency is analogous to the normal distribution. Also, in the original image data I, the reliability distance d is not exactly equal to zero, but the average value is equal (or almost equal) to zero.

Figure 24:
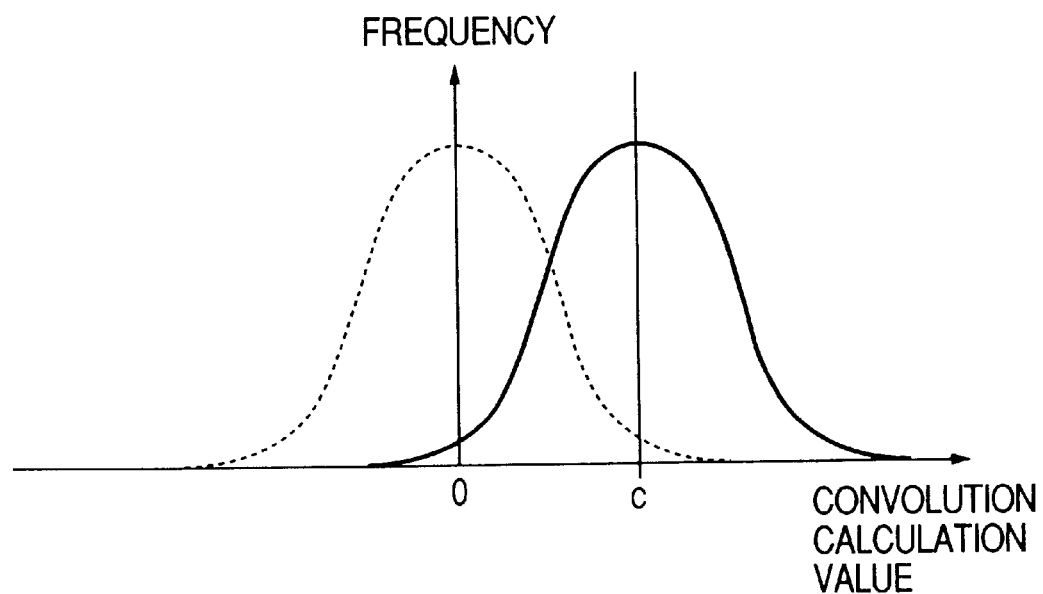
FIG. 24 is a graphic representation illustrating an appearance frequency distribution when the reliability distance d is extracted from the digital watermark embedded image.

On the other hand, in the case where the image data (blue component) after having the bit information "1" embedded as shown in FIG. 19 is convoluted on I'(x,y), the reliability distance d has a frequency distribution, as shown in FIG. 24. That is, the frequency distribution is shifted to the right while maintaining a distribution shape of FIG. 23. In this way, the image data after having one bit making up the appendant information Inf embedded has an average value of c (or a value very close to c) although the reliability distance is not exactly equal to c.

In FIG. 24, an example in which the bit information "1" has been embedded is shown. However, in the case where the bit information "0" is embedded, the frequency distribution of FIG. 23 is shifted to the left.

As described above, in the case where the appendant information Inf (each bit information) is embedded using the patchwork method, it is better to embed as many bits (number of using the pattern arrangement) as possible, whereby the statistical distribution as shown in FIGS. 23 and 24 is likely to appear correctly. That is, it is more precisely detected whether or not each bit information making up the appendant information Inf has been embedded, or whether the bit information embedded is "1" or "0".

[3-5-3 Offset Adjustment Process]

Next, the configuration of an offset adjustment unit 2002 will be described below.

The image data $wI_2'$ after having passed through the scaling process is input into the offset adjustment unit 2002. Thereafter, the start bit is detected using a reliability distance calculation of FIG. 6. The offset adjustment unit 2002 generates only five reliability distances corresponding to 5 bits of the start bit $Inf_1$. The start bit $Inf_1$ is a part of the appendant information Inf which has been embedded beforehand by the appendant information embedding unit 0104, and corresponds to 5 bits in this embodiment, as shown in FIG. 36.

The start bit $Inf_1$ is first 5 bits in conceptual sense, but does not exist adjacently or closely in the image having the appendant information Inf embedded, and rather exists sporadically. This is because the bit information is embedded in succession, correspondingly with each coefficient value making up the cone mask of the correspondence table 2.

Figure 28:
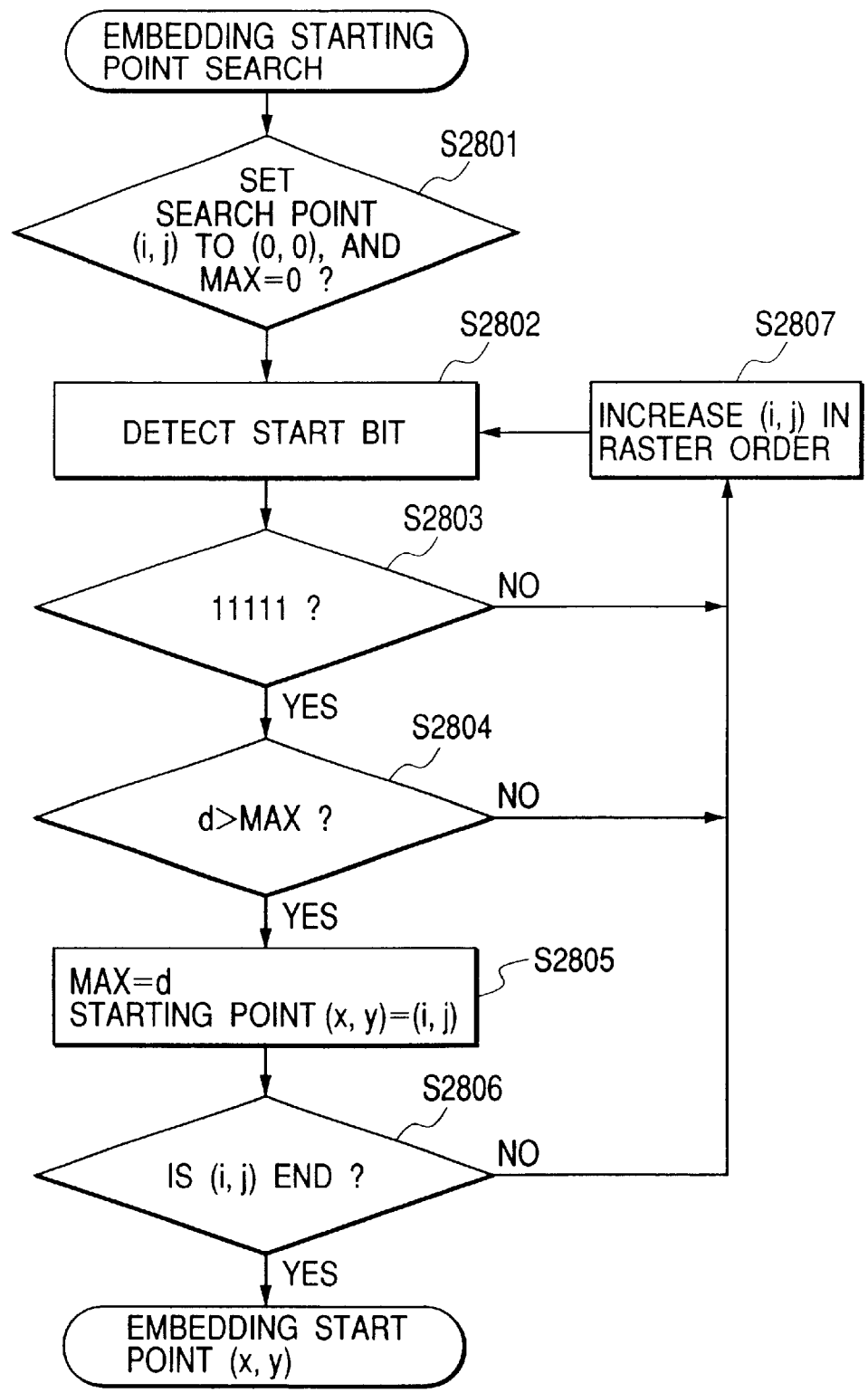
FIG. 28 is a flowchart showing the offset adjustment process.

FIG. 28 is a flowchart showing a process of the offset adjustment unit 2002. The following discussion will be made in accordance with the flowchart of FIG. 28.

In the offset adjustment unit 2002, it is first assumed at step 2801 that for the input image data $wI_2'$, the most left upper coordinates are the embedding start coordinates. Simultaneously, the maximum value MAX is set to 0. At step 2802, the start bit is detected using the reliability distance calculation unit of FIG. 6.

A determination is made whether or not the bit information of the first to fifth bits as obtained here is the correct start bit "11111" at step 2803. If this point is the correct embedding start coordinates, five consecutive positive reliability distances d are detected, as a result of detection. If not, the five positive reliability distances d may often exist consecutively. The above determination is made successively, and the position at which the correct start bit $Inf_1$ can be detected may be decided to be the embedding start coordinates.

In practice, however, the correct start bit $Inf_1$ may be detected at other point than the embedding start coordinates. This cause will be explained below using FIG. 27.

Figure 27:
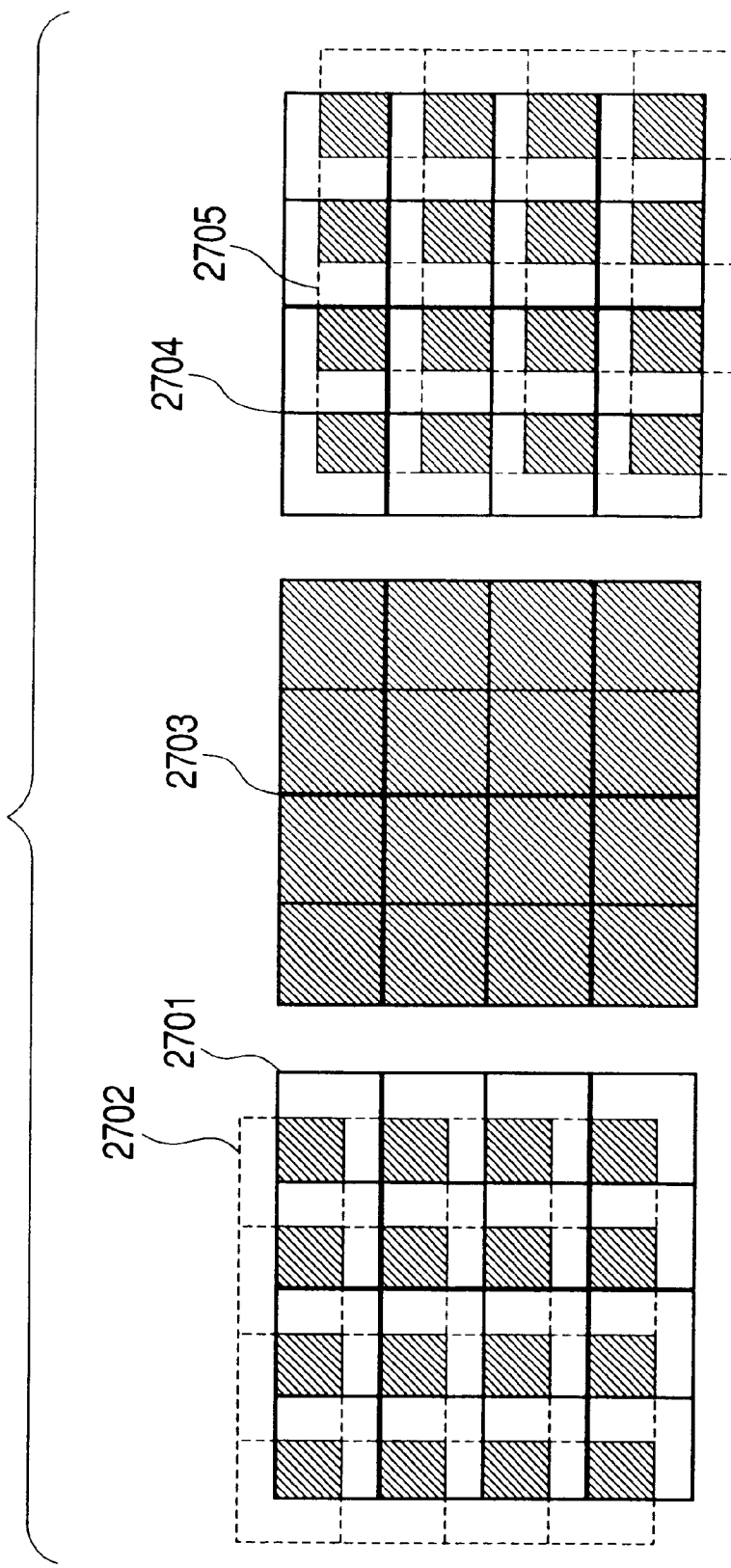
FIG. 27 is a diagram illustrating how to perform an offset adjustment process.

FIG. 27 illustrates how to search the intrinsic macro block for the positions (2701, 2703, 2704) while performing convolution, using the same pattern arrangement (2702, 2705) (the cone mask is also referenced as the arrangement information) as when embedding the appendant information Inf, in order to extract the appendant information Inf embedded by the patchwork method for use in this embodiment. The search is continuously performed from the left figure to the right figure.

In FIG. 27, for the simplicity, one macro block (the minimum unit capable of extracting the appendant information Inf) that is a part of the image data $wI_2'$ is noted. In this figure, one square corresponds to the size of the pattern arrangement to embed one bit information.

To the left of FIG. 27, if there is the relation that a macro block 2702 is located left above a practical macro block 2701, the original image and the pattern arrangement for extracting the appendant information Inf overlap each other only in the hatched sections.

Centrally in FIG. 27, the search is further performed, and then the position being searched and the position of the practical macro block have been exactly coincident. In this state, the pattern arrangement for convolution and the macro block lie one on another at the maximum area.

To the right of FIG. 27, the position being searched is located right below the position of macro block at which the appendant information Inf has been actually embedded. In this state, the pattern arrangement for convolution and the macro block overlap each other in the hatched sections.

In FIG. 27, if the pattern arrangement for convolution and the macro block overlap each other fully, it is possible to extract the correct start bit $Inf_1$. In these three cases, the overlapping areas are different, and the reliability distances d are different.

The overlapping area can be considered in place of the reliability distance d. That is, if the pattern arrangement for convolution and the macro block are exactly coincident, the reliability distance d for each bit information is very close to $\pm 32c^2$, as previously described.

Hence, in this embodiment, if it is determined at step 2803 that the start bit $Inf_1$ is not correct, the operation transfers to the next search point in raster order at step 2807, as shown in FIG. 28. On the other hand, if it is determined that the start bit $Inf_1$ is correct, a determination is made at step 2804 whether or not the reliability distance d is greater than the maximum value MAX. If the reliability distance d is smaller than the maximum value MAX, the operation transfers to the next search point in raster order by Step 2807. On the other hand, if the reliability distance d is greater than the maximum value MAX, the maximum value MAX is updated to the current reliability distance d, and concurrently the current search point is stored as the embedding start point. At step 2806, a determination is made whether or not all the search points have been searched. If not, the operation transfers to the next search point in raster order at step 2807. On the other hand, if all the search points have been searched, the embedding start point that is stored at present is output, and the process is ended.

Through the above process, the offset adjustment unit 2002 in this embodiment detects the start bit $Inf_1$, and the information of the coordinates having the greatest reliability distance d among the coordinates of the correct start bit $Inf_1$ is judged as the embedding start point of the appendant information Inf, and output as the embedding start coordinates to the later stage.

[3-5-4 Utilization Information Extracting Unit]

The utilization information extracting unit 2003 inputs the embedding start coordinates and the appendant information Inf embedded image data from the offset adjustment unit 2002 at the previous stage, calculates the reliability distance d for each bit information making up the utilization information $Inf_2$, using the operation as shown in FIG. 6, and outputs the reliability distance d1 for each bit information to the statistical test unit 2006 at the next stage.

The calculation of the reliability distance d1 corresponding to each bit information making up the utilization information $Inf_2$ substantially corresponds to extracting each bit of the embedded utilization information $Inf_2$. This will be described later.

Herein, each reliability distance d is only calculated, based on the embedding start coordinates discriminated by the above search, but the start bit $Inf_1$ of 5 bits is not extracted.

[3-6 Statistical Test Process]

The statistical test unit 2006 discriminates the reliability of the reliability distance d1 obtained by the utilization information extracting unit 2003 of FIG. 20. This discrimination is made by creating the reliability distance d2 using a second pattern arrangement that is different from the first pattern arrangement used in extracting the appendant information Inf (utilization information $Inf_2$), and producing the reliability coordinate D with reference to an appearance frequency distribution of the reliability distance d2.

Herein, the reliability distance d1 is calculated using the first pattern arrangement (the cone mask is referenced as the arrangement information) to extract the utilization information $Inf_2$ in the utilization information extracting unit 2003, and the reliability distance d2 is calculated using the second pattern arrangement described later that is different from the first pattern arrangement. The first pattern arrangement is the pattern arrangement of FIG. 9 that is usually used to embed the appendant information Inf (start bit $Inf_1$, utilization information $Inf_2$).

The details of the second pattern arrangement and the reliability coordinate D will be described later.

[3-6-1 Second Pattern Arrangement Extracting Process]

<Central Limit Theorem>

$\{a_n\}$, $\{b_n\}$ are pixel value sets consisting of n elements, each element of a partial set A and a partial set B as shown in FIG. 30 having each pixel value.

The reliability distance d ($\Sigma(a_i - b_i)/n$) has an expected value of 0, because the values of elements $a_n$ and $b_n$ are not correlated, if $\{a_n\}$ and $\{b_n\}$ have a sufficient number n of elements. Owing to a central limit theorem, the distribution of the reliability distance d has a normal distribution.

Herein, the central limit theorem will be briefly described below.

When random samples of size $n_c$ are extracted from a population (which may not be a normal distribution) having an average value $m_c$ and a standard deviation $\sigma_c$, the distribution of sample average values $S_c$ approaches to the normal distribution $N(m_c, (\sigma_c/\sqrt{n_c})^2)$ with a larger $n_c$, according to the central limit theorem.

The standard deviation ac of the population typically is unknown, but when the number of samples $n_c$ is sufficiently large, and the number of populations $N_c$, is much larger than the number of samples $n_c$, the standard deviation $s_c$ of samples may be substituted for the standard deviation $\sigma_c$ of the population with no difficulty in practice.

We turn back to explanation of this embodiment. Firstly, the appearance frequency distribution of the reliability distance d1 calculated by the utilization information extracting unit 2003 may be greatly varied depending on whether the utilization information $Inf_2$ can be extracted correctly.

Figure 25:
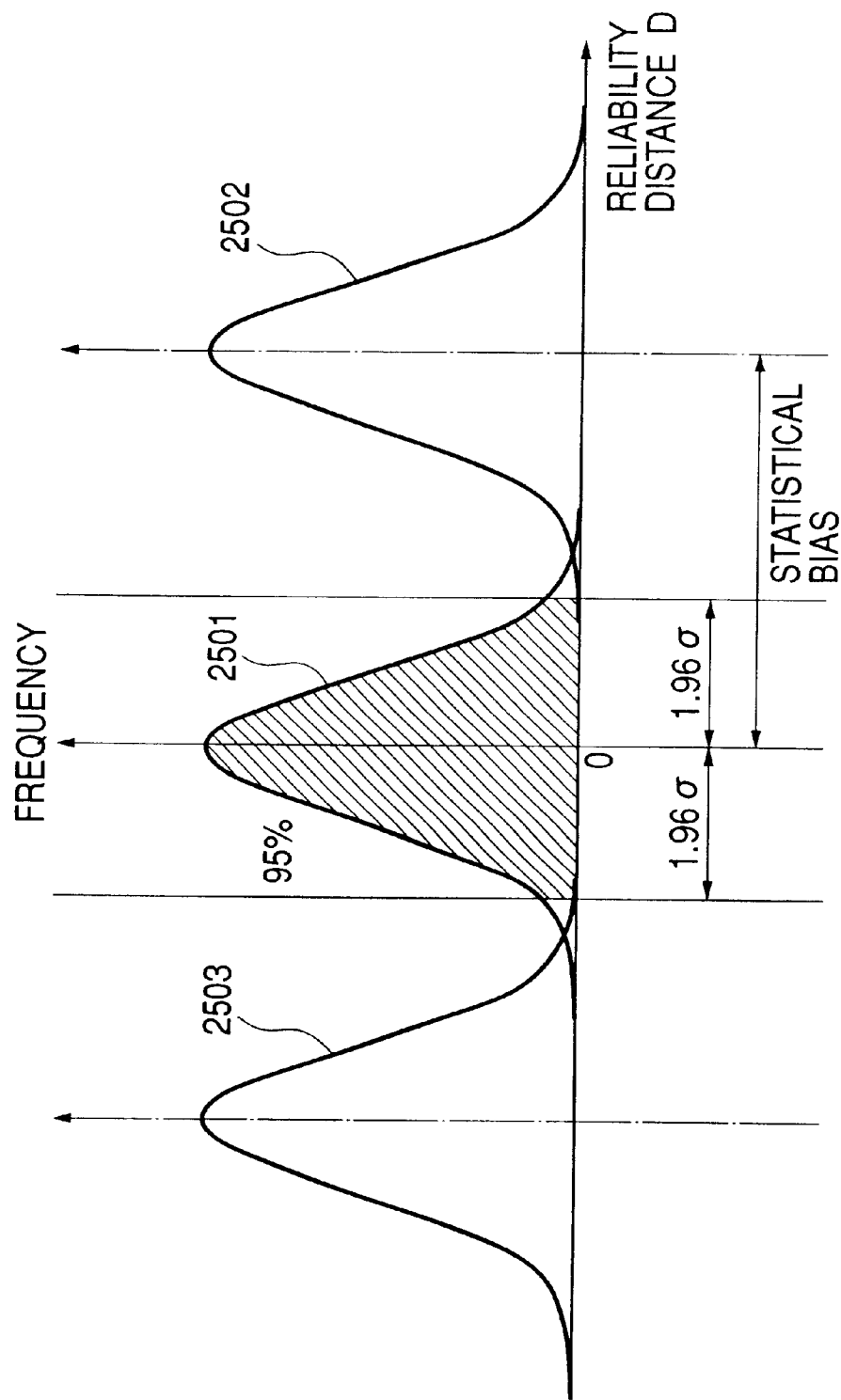
FIG. 25 is a graphic representation illustrating an example of the appearance frequency distribution with the reliability distance d1, d2 in this embodiment.

For example, when the start bit $Inf_1$ is detected falsely (e.g., when the offset adjustment fails), the appearance frequency distribution of the reliability d1 is like a normal distribution 2501 of FIG. 25, because no bit information is actually embedded at the position where the utilization information $Inf_2$ has been possibly embedded.

On the other hand, if the utilization information $Inf_2$ is correctly extracted, each reliability distance d1 corresponding to the bit information "1" making up the utilization information $Inf_2$ is accumulated at the position of the normal distribution 2502, while each reliability distance d1 corresponding to the bit information "0" making up the utilization information $Inf_2$ is accumulated at the position of the normal distribution 2503. Hence, two "mountains" appear in this case. The ratio of heights of these two "mountains" is almost equal to the ratio of the number of bit information "1" to the number of bit information "0" making up the utilization information $Inf_2$.

However, it is assumed here that for the original image having no appendant information embedded, the reliability distance d1 obtained by the convolution calculation of the first pattern arrangement is like a normal distribution 2501.

Accordingly, in reality it is not possible to determine whether or not the utilization information $Inf_2$ is correctly extracted, unless the state of the original image is known.

Hence, in this embodiment, the state of the original image can be fully discriminated if the appendant information has been embedded. Using the so-called second pattern arrangement, the normal distribution of the reliability distance d2 is produced, and thought as 2501 to determine whether or not the utilization information $Inf_2$ has been correctly extracted.

For example, if the appearance frequency distribution of the reliability distance d1 exists outside the hatched portion (constituent elements up to 95% from the center) making up the normal distribution 2501 produced by the reliability distance d2, there is some statistical bias in the image of interest in which it can be thought that the utilization information $Inf_2$ has been embedded, so that the probability of the utilization information $Inf_2$ can be statistically determined. This method will be detailed later.

Next, a method for producing a distribution (normal distribution 2501 of FIG. 25) analogous to the appearance frequency distribution of the reliability distance d1 before the appendant information Inf is embedded, using the image data having the appendant information Inf (utilization information $Inf_2$) embedded will be described below.

In this embodiment, the reliability distance d2 making up the distribution analogous to the normal distribution 2501 is calculated, using the second pattern arrangement extracting unit 2005.

The second pattern arrangement extracting unit 2005 calculates the reliability distance d2, using the second pattern arrangement which is orthogonal to the first pattern arrangement for use in the utilization information extracting unit 2003, and operates substantially equally to the utilization information extracting unit 2003, for example, in respect of the convolution calculation.

For the explanation by contrast, the pattern arrangement of FIG. 9 for use in the utilization information extracting unit 2003 and the mask (cone mask) for referring to the position at which this pattern arrangement is located, are referred to as a "first pattern arrangement" and a "first position reference mask", respectively. The pattern arrangement which is orthogonal to the first pattern arrangement and the mask for referring to the position at which this orthogonal pattern arrangement is located are referred to as a "second pattern arrangement" and a "second position reference mask", respectively.

The embedding start coordinates from the offset adjustment unit 2002 are first input into the second pattern arrangement extracting unit 2005, and the reliability distance d2 is calculated, using the calculation of reliability distance of FIG. 6.

At this time, the pattern arrangement for use in the calculation of reliability distance of FIG. 6 is not a pattern arrangement 0901 of FIG. 9 that is used for embedding, but a pattern arrangement 3601 or 3602 which is orthogonal to this pattern arrangement 0901.

Figure 33:
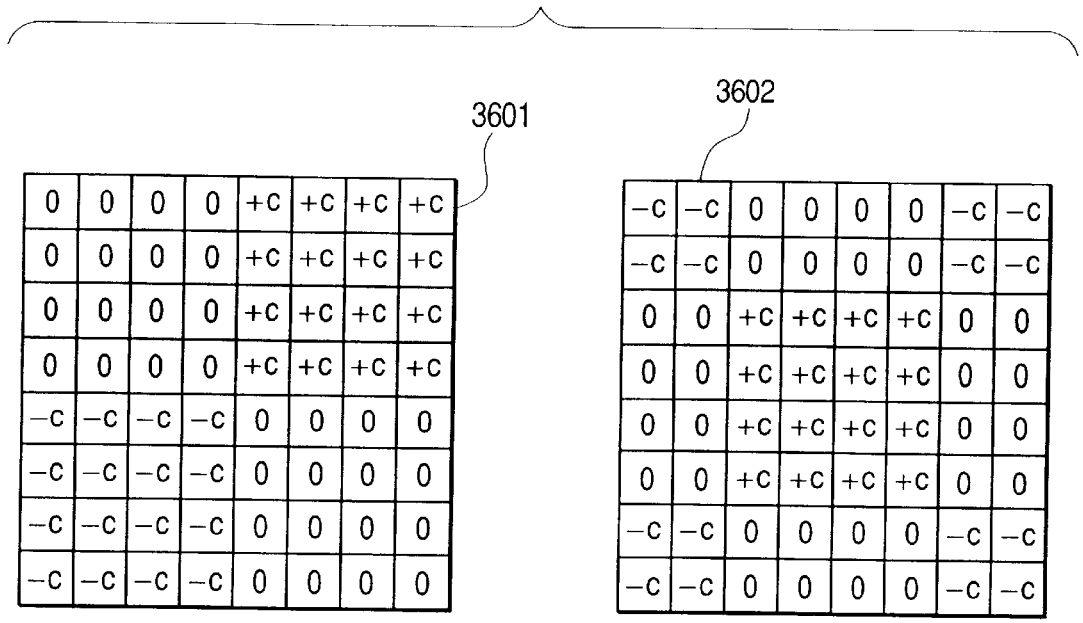
FIG. 33 is a diagram illustrating an example of a pattern arrangement orthogonal to the pattern arrangement of FIG. 9.

The reason is that the reliability distance d2 calculated using the pattern arrangement 3601 or 3602 of FIG. 33 is not affected at all by manipulation with the pattern arrangement 0901 of FIG. 9 for use in embedding the appendant information Inf.

Figure 34:
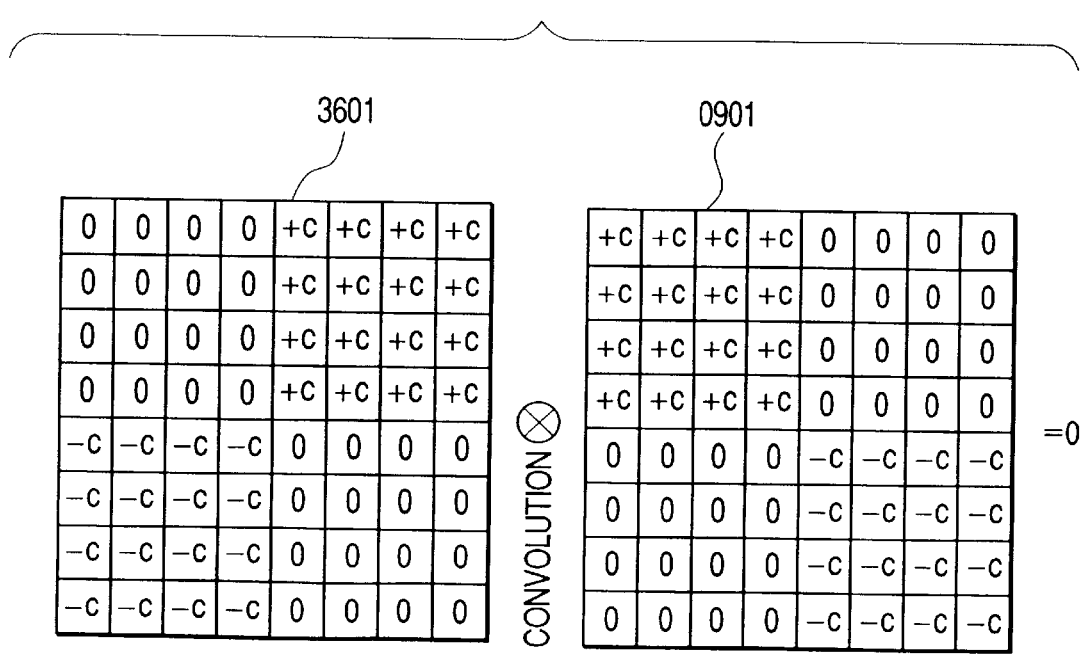
FIG. 34 is an explanatory diagram for explaining an "orthogonal" pattern arrangement.

As shown in FIG. 34, the convolution calculation between the pattern arrangement 0901 of FIG. 9 and the pattern arrangement 3601 which is orthogonal thereto results in zero. This is the same with the pattern arrangement 3602. That is, the convolution calculation between the first and second pattern arrangements results in zero. Accordingly, even if the density of the original image has been changed using the first pattern arrangement, the reliability distance d obtained by the convolution calculation using the second pattern arrangement is not affected at all.

Therefore, for the appendant information Inf embedded image, the appearance frequency distribution of the reliability distance d2 obtained by the convolution calculation using the second pattern arrangement is almost identical to the normal distribution 2501 of FIG. 25. Accordingly, the appearance frequency distribution is regarded as the normal distribution 2501.

The normal distribution 2501 obtained here is a judgement reference required for the statistical test process 3507 of FIG. 32.

The second pattern arrangement extracting process 2005 produces a normal distribution of the reliability distance d2, using a "first pattern which is orthogonal to pattern arrangement" such as 3601, 3602 of FIG. 33 and a second position reference mask as indicated at 3802 in FIG. 35.

The condition of "first pattern orthogonal pattern arrangement" described above will be described below.

(1) The same size of the pattern arrangement 0901 of FIG. 9 as shown in FIG. 33.

(2) The convolution calculation with the pattern arrangement 0901 of FIG. 9 for use in embedding the appendant information Inf such as the pattern arrangements 3601, 3602 results in zero.

The convolution calculation as shown in FIG. 34 is identical to the convolution calculation as shown in FIGS. 21 and 22.

In this embodiment, a situation where the result of convolution is equal to zero is called "pattern arrangements which are orthogonal to each other", in the same way where the inner product of vectors is zero when the vectors are orthogonal to each other. Accordingly, the pattern arrangements 3601, 3602 of FIG. 33 are "pattern arrangements which are orthogonal to the pattern arrangement 0901 of FIG. 9".

The reason why the pattern arrangement which is orthogonal to the pattern arrangement for use in embedding the appendant information Inf is used for calculation of the reliability distance d2 is that the distribution of the reliability distance d2 has no statistical bias, namely, the appearance frequency distribution at the center of 0 is produced.

Also, a "first pattern which is orthogonal to pattern arrangement" has a required condition such that (3) The pattern arrangement has non-zero elements equal in number to the non-zero elements of the pattern arrangement for use in the utilization information extracting unit 2003, and the number of positive elements and the number of negative elements are equal.

This condition is provided to extract the reliability distance d1 and the reliability distance d2 under the same calculation conditions.

Then, in this embodiment, a "second position reference mask" uses a reference mask as shown at 3802 in FIG. 35, having a different pattern from a first embedding position reference mask 3801 for use in embedding the appendant information Inf, and a different size from the first embedding position reference mask 3801.

If the first and second pattern arrangements are different, the appearance frequency distribution of the reliability distance d2 is substantially the normal distribution 2501.

However, in the case where the detecting position of the start bit is not complete, there is the possibility that the statistical bias may be detected although the convolution calculation is performed using the second pattern arrangement. In this embodiment, in view of this possibility, the first and second position reference masks are made in different sizes, to cancel the periodical elements. Or the pattern arrangements may be differently disposed within the mask to avoid the convolution calculation in the same area.

In this case, for the "second position reference mask", the coefficients making up the second position reference mask are only necessary to be randomly distributed, and may not be a cone mask.

If the "second embedding position reference mask" is set to be different from the "first embedding position reference mask", the "second embedding position reference mask" may be created by the embedding position determining unit 2004 of FIG. 20.

Generally, in consideration of the cutting endurance, it can not be thought that the first position reference mask (cone mask) takes a very large size all over the image data into which the appendant information Inf is to be embedded. Hence, the "second position reference mask" may be relatively large. In this embodiment, the second mask for use in calculating the reliability distance d1 on the appendant information Inf side is set to be larger in size than the first mask to be referenced in embedding the appendant information Inf.

However, the present invention is not limited thereto, but even if the masks are equal sizes, the effect can be provided to some extent. Accordingly, the "second position reference mask" may be created by the embedding position determining unit 2001 of FIG. 20.

The minimum necessary condition for each mask is that the number of repetitive bits making up the appendant information Inf that is applied to each mask is equal within the image area of the same size.

In the case where the satisfactory result can not be obtained through the second pattern arrangement extracting process, the reliability distance d2 is recalculated, using another second pattern arrangement or second position reference mask with the above condition, thereby possibly producing an ideal appearance frequency distribution as shown at 2501 in FIG. 25.

The specific manipulation of the second pattern arrangement extracting unit 2005 will be described below.

In this embodiment, the first position reference mask is a 32×32 cone mask, and the second position reference mask is a 64×64 cone mask. In the two masks, the relative arrangements of the coefficients are quite different.

Firstly, the second pattern arrangement extracting unit 2005 performs the decision of the extracting position in accordance with the following correspondence table 3.

<Correspondence Table 3>

| Order of each bit information | 1 | 2 | 3 | 4 | ... | 69 |
|---|---|---|---|---|---|---|
| Coefficient value within second position reference mask | 0,1 | 2,3 | 4,5 | 6,7 | ... | 136,137 |

In the second position reference mask, 16 coefficients of the same value exist within the mask. On the other hand, the first position reference mask of 32×32 has four same coefficients repeated within the 32×32 mask, in the case where the mask is referenced in the correspondence table 2. That is, in the image data of the same size, the first position reference mask and the second position reference mask have the equal number of coefficients of same value.

In this embodiment, the second pattern arrangement is allocated in the positional relation in accordance with the rules of the correspondence table 3, the convolution calculation is successively performed, and the 69 reliability distances d2 corresponding to each bit information are calculated.

[3-6-2 Reliability Index D]

The reliability distance d2 produced by the second pattern arrangement extracting unit 2005 appears substantially identically to the normal distribution 2501, but in the normal distribution, it is known that 95% of the samples (reliability distance d2) appear within the range as defined by the following Equation (25.1).

$$m-1.96\sigma < d2 < m+1.96\sigma \qquad \text{Equation (25.1)}$$

where $\sigma$ is a standard deviation of the reliability distance d2, and m is an average value.

The above range is referred to as "95% confidence interval".

$m-1.96\sigma$ and $m+1.96\sigma$ are calculated, using the reliability distance d2 obtained by the second pattern arrangement extracting unit 2005.

The appearance frequency distribution of the reliability distance d1 to be input from the utilization information extracting unit 2003 into the statistical test unit 2006 is a normal distribution 2502 of FIG. 25 when the bit information is "1", or a normal distribution 2503 of FIG. 25 when the bit information is "0". Consequently, there is the high probability that the reliability distance d1 corresponding to the utilization information $Inf_2$ exists outside the 95% confidence interval (the hatched portion in FIG. 25) obtained by the second pattern arrangement extracting unit 2005.

By the way, in the case where there is no utilization information $Inf_2$ in the image to be processed when the offset adjustment unit 2002 performs the operation, the appearance frequency distribution of the reliability distance d1 is like the normal distribution 2501.

In this case, the probability that all the 64 reliability distances d1 corresponding to the utilization information $Inf_2$ are not contained within the confidence interval of Equation (25.1) is as small as $(1-0.95)$ to the 64-th power.

Accordingly, if the normal distribution 2501 is calculated based on the reliability distance d2, it is possible to determine almost surely whether or not the appendant information Inf (utilization information $Inf_2$) is embedded, by checking to see whether or not the appearance frequency distribution obtained based on the reliability distance d1 is contained within the range covering most of this normal distribution.

The statistical test unit 2006 judges the reliability that the appendant information Inf (utilization information $Inf_2$) is embedded, using the above property.

In this embodiment, the reliability that the utilization information Inf is embedded is treated as the reliability index D.

This reliability index D is defined as the proportion of the number of reliability distances d1 present outside the range of Equation (25.1) with respect to the number of all the reliability distances d1 produced by the utilization information extracting unit 2003.

The statistical test unit 2006 judges that the overall appearance frequency distribution of the reliability distance d1 has been artificially shifted to the position 2502 or 2503 of FIG. 25, namely, the utilization information $Inf_2$ has been surely embedded into the image data, if this reliability index D is greater than the threshold $\alpha$.

Accordingly, considering that the reliability distance d1 itself for use in this judgement is reliable information, it is permitted that this reliability distance d1 is further transferred to a comparison unit 2007 at the later stage.

Regarding the reliability index D as indicated at reliability display step 3510 in FIG. 32, the reliability index D of the utilization information $Inf_2$, or a message based on the index D may be displayed on the monitor.

For example, if the reliability index D is not greater than the threshold $\alpha$, a message indicating that "utilization information $Inf_2$ can not be extracted correctly" is displayed, and the procedure returns from the statistical test step 3507 to step 3502 for inputting the image again.

[3-7 Comparison Process]

The comparison unit 2007 of FIG. 20 has the input value of the reliability distance d1 which is passed through the utilization information extracting unit 2003 and the statistical test unit 2006. Since the reliability distance d1 input herein is highly reliable information, what is needed here is to simply determine whether each bit information corresponding to the reliability distance d1 is "1" or "0".

More specifically, if the reliability distance d1 of bit information making up the utilization information $Inf_2$ is positive, this bit information is determined to be "1", while if the reliability distance d1 is negative, this bit information is determined to be "0".

The utilization information $Inf_2$ obtained by the above determination is output as the final data for the user's reference information or control signal.

Thus, a series of operations from embedding the appendant information to extraction have been described.

(Variation)

In the above embodiment, the appendant information Inf (utilization information $Inf_2$) may be encoded for error correction, so that the reliability of the utilization information $Inf_2$ extracted is further improved.

Note that the present invention may be applied to part of a system comprised of a plurality of apparatuses (e.g., a host computer, an interface unit, a reader, a printer, and so on) or a single apparatus (e.g., a copying machine or facsimile terminal equipment).

The present invention is not limited to the apparatuses and methods for implementing the above embodiment, but may encompass an instance where a program code of software for implementing the above embodiment is supplied to a computer (CPU or MPU) within the system or apparatus, and the computer within the system or apparatus controls various devices to be operated in accordance with the program code, in the above embodiment.

In this instance, the program code itself of the software can implement the functions of the above embodiment, and the program code itself and means for supplying the program code to the computer, or more particularly, a storage medium for storing the program code, are covered within the scope of the invention.

The examples of such storage medium for storing the program code may include a floppy disk, a hard disk, an optical disk, an optical magnetic disk, CD-ROM, a magnetic tape, a non-volatile memory card, and ROM.

The present invention can also encompass the program codes in the case where the computer controls various kinds of devices not only in accordance with the supplied program code, but also in corporation with an OS (Operating System) of the computer on which the program code is working, or other application program software to implement the functions of the embodiment.

Further, in this invention, the supplied program code may be stored in a memory provided in a function extension board of the computer or a function extended unit connected to the computer, and then a CPU provided in the function extension board or the function extended unit may execute part or all of the actual operations in accordance with the instructions of the program code, to implement the embodiment.

In the embodiment, the digital watermark information is embedded using the cone mask. However, the invention is not limited to such cone mask. In particular, the digital watermark information may be embedded using a blue noise mask.

The present invention may encompass the configuration including at least one of various above-mentioned features.

As described above, with the present invention, the image data without digital watermark embedded can be inferred by performing the arithmetic operation with a pattern arrangement different from the pattern arrangement to extract the digital watermark information from the image data into which the digital watermark information may be embedded. And the reliability of the information extracted to derive the digital watermark information by referring to this state is tested, so that the digital watermark information can be correctly extracted.

With the present invention, in the case where the geometrical distortion is applied to the digital watermark embedded image, this distortion can be correctly determined. Accordingly, the extraction of the digital watermark information (appendant information) can be correctly effected.

The present invention may be modified in various ways within the scope of the following claims.

What is claimed is:

1. An image processing apparatus for extracting digital watermark information from second image data into which the digital watermark information is embedded to be less visible to human eyes by modifying first image data, comprising:

first extracting means for extracting first information corresponding to the digital watermark information by performing an arithmetical operation on said second image data using a first pattern arrangement;

second extracting means for extracting second information indicating the state of said first image data having no digital watermark information by performing an arithmetical operation on said second image data using a second pattern arrangement without reference to said first image; and test means for testing a reliability of the first information extracted by said first extracting means based on the second information.

2. The image processing apparatus according to claim 1, wherein said test means further comprises display means for displaying information concerning said reliability.

3. The image processing apparatus according to claim 1, further comprising digital watermark information creating means for creating the digital watermark information using the first information extracted by said first extracting means in accordance with the test result.

4. The image processing apparatus according to claim 1, wherein the arithmetic operation performed by said first and second extracting means is the convolution calculation, said first information is obtained by the convolution calculation of said first pattern arrangement and said second image data, and said second information is obtained by the convolution calculation of said second patten arrangement and said second image data.

5. The image processing apparatus according to claim 1, wherein each of said first pattern arrangement and said second pattern arrangement is a two dimensional matrix consisting of n×n elements.

6. The image processing apparatus according to claim 5, wherein said first pattern arrangement and said second pattern arrangement have such a relation that the convolution calculation results in zero.

7. The image processing apparatus according to claim 5, wherein said first pattern arrangement and said second pattern arrangement have an equal number of non-zero elements, the equal number of positive elements, and the equal number of negative elements.

8. The image processing apparatus according to claim 5, wherein each of said first pattern arrangement and said second pattern arrangement has the sum of elements within the matrix being zero.

9. An image processing method for extracting digital watermark information from second image data into which the digital watermark information is embedded to be less visible to human eyes by modifying first image data, comprising:

a first extracting step for extracting first information corresponding to the digital watermark information by performing an arithmetical operation on the second image data using a first pattern arrangement;

a second extracting step for extracting second information indicating the state of the first image data having no digital watermark information by performing an arithmetical operation on the second image data using a second pattern arrangement without reference to the first image; and a test step for testing a reliability of the first information extracted at said first extracting step based on the second information.

10. A storage medium for storing an image processing program for extracting digital watermark information from second image data into which the digital watermark information is embedded to be less visible to human eyes by modifying first image data, said image processing program being readable from a computer, the image processing program comprising:

a first extracting step for extracting first information corresponding to the digital watermark information by performing an arithmetical operation on the second image data using a first pattern arrangement;

a second extracting step for extracting second information indicating the state of the first image data having no digital watermark information by performing an arithmetical operation on the second image data using a second pattern arrangement without reference to the first image; and a test step for testing the reliability of the first information extracted at said first extracting step based on the second information.

11. An image processing apparatus for extracting digital watermark information from image data into which the digital watermark information including positional information has been embedded to be less visible to human eyes, comprising:

search means for performing a process for extracting the positional information from the image data by multiple times at the different extracting start positions;

calculation means for calculating a reliability indicating the probability of extracting the positional information for each information being extracted as the positional information by said search means; and discrimination means for discriminating the position at which the digital watermark information is embedded in the image data, based on said reliability.

12. The image processing apparatus according to claim 11, wherein said digital watermark information includes the position information and the utilization information, and the utilization information includes the ID of said apparatus or the user ID.

13. The image processing apparatus according to claim 11, wherein said digital watermark information includes the positional information and the utilization information, and the utilization information includes the information for controlling said apparatus.

14. The image processing apparatus according to claim 11, wherein said reliability is calculated by performing an arithmetic operation of said image data with a matrix consisting of n×n elements.

15. The image processing apparatus according to claim 14, wherein said arithmetic operation is the convolution calculation.

16. The image processing apparatus according to claim 11, further comprising extracting means for extracting the digital watermark information embedded in said image data, with reference to a position of said image data, based on the result of said discrimination means.

17. An image processing method for extracting digital watermark information from image data into which the digital watermark information including the positional information is embedded to be less visible to human eyes, comprising:

a search step for performing a process for extracting the positional information from the image data by multiple times at the different extracting start positions;

a calculation step for calculating a reliability indicating the probability of extracting the positional information for each information being extracted as the positional information at said search step; and a discrimination step for discriminating the position at which the digital watermark information is embedded in the image data, based on said reliability.

18. A storage medium for storing an image processing program for extracting digital watermark information from image data into which the digital watermark information including the positional information is embedded to be less visible to human eyes, said image processing program being readable from the computer, said program comprising:

a search step for performing a process for extracting the positional information from the image data by multiple times at the different extracting start positions;

a calculation step for calculating the reliability indicating the probability of extracting the positional information for each information being extracted as the positional information at said search step; and a discrimination step for discriminating the position at which the digital watermark information is embedded in the image data, based on said reliability.

19. An image processing apparatus for extracting digital watermark information from a registration signal indicating a geometrical state of image data and the image data into which the digital watermark information is possibly embedded to be less visible to human eyes, comprising:

transform means for performing a frequency transform of the image data to generate samples representing a frequency spectrum;

derivation means for performing a derivation process on said samples generated by said transform means by using a derivation filter; and correction means for performing a geometrical correction of the image data based on a signal derivation-processed by said derivation means and the information concerning said registration signal.

20. The image processing apparatus according to claim 19, wherein said geometrical correction is scaling.

21. The image processing apparatus according to claim 19, wherein said digital watermark information includes the positional information indicating a digital watermark reference position.

22. The image processing apparatus according to claim 21, wherein said digital watermark information includes the positional information and the utilization information, and the utilization information includes the ID of said apparatus or the user ID.

23. The image processing apparatus according to claim 21, wherein said digital watermark information includes the positional information and the utilization information, and the utilization information includes the information for controlling said apparatus.

24. The image processing apparatus according to claim 19, further comprising extracting means for extracting the digital watermark information from said image data corrected.

25. The image processing apparatus according to claim 19, wherein said registration signal is an impulse signal disposed at a predetermined position of said image data in the frequency region.

26. The image processing apparatus according to claim 19, wherein said derivation process is a second order derivation process.

27. The image processing apparatus according to claim 19, wherein said transform means perform the frequency transform for only a color component in a part of said image data.

28. The image processing apparatus according to claim 19, wherein said color component in the part of said image data is a blue component.

29. An image processing method for extracting digital watermark information from a registration signal indicating a geometrical state of image data and the image data into which the digital watermark information is possibly embedded to be less visible to human eyes, comprising:

a transform step for performing a frequency transform of the image data to generate samples representing a frequency spectrum;

a derivation step for performing a derivation process on said samples generated at said transform step by using a derivation filter; and a correction step for performing a geometrical correction of the image data based on a signal derivation-processed at said derivation step and the information concerning said registration signal.

30. A storage medium for storing an image processing program for extracting digital watermark information from a registration signal indicating a geometrical state of image data and the image data into which the digital watermark information is possibly embedded to be less visible to human eyes, said image processing program being readable from the computer, said program comprising:

a transform step for performing a frequency transform of the image data to generate samples representing a frequency spectrum;

a derivation step for performing a derivation process to said samples generated at said transform step by using a derivation filter; and a correction step for performing a geometrical correction of the image data based on a signal derivation-processed at said derivation step and the information concerning said registration signal.

* * * * *

UNITED STATES PATENT AND TRADEMARK OFFICE
CERTIFICATE OF CORRECTION

PATENT NO. : 6,826,290 B1
DATED : November 30, 2004
INVENTOR(S) : Tomochika Murakami et al.

It is certified that error appears in the above-identified patent and that said Letters Patent is hereby corrected as shown below:

<u>Column 3,</u>
Line 23, "judging" should read -- judge --.

<u>Column 5,</u>
Line 57, "human" should read -- humans --.

<u>Column 6,</u>
Line 28, "human." should read -- humans. --.
Line 37, "output" should read -- outputs --.

<u>Column 7,</u>
Line 60, "net" should read -- next --.

<u>Column 28,</u>
Line 54, "Step" should read -- step --.

<u>Column 29,</u>
Line 50, "elements an" should read -- elements $a_n$ --.
Line 62, "deviation ac" should read -- deviation $\sigma_c$ --.
Line 64, "$N_c$, is" should read -- $N_c$ is --.

<u>Column 36,</u>
Line 21, "patten" should read -- pattern --.

<u>Column 37,</u>
Line 29, "position" should read -- positional --.

UNITED STATES PATENT AND TRADEMARK OFFICE
CERTIFICATE OF CORRECTION

PATENT NO. : 6,826,290 B1
DATED : November 30, 2004
INVENTOR(S) : Tomochika Murakami et al.

It is certified that error appears in the above-identified patent and that said Letters Patent is hereby corrected as shown below:

<u>Column 40,</u>
Line 13, -- 31.  The image processing apparatus according to claim 19, wherein said derivation filter is a Laplacian filter. -- should be inserted.

Signed and Sealed this

Third Day of May, 2005

JON W. DUDAS
*Director of the United States Patent and Trademark Office*